(12) United States Patent
Rowlands

(10) Patent No.: US 7,343,456 B2
(45) Date of Patent: Mar. 11, 2008

(54) LOAD-LINKED/STORE CONDITIONAL MECHANISM IN A CC-NUMA SYSTEM

(75) Inventor: Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 881 days.

(21) Appl. No.: 10/435,189

(22) Filed: May 9, 2003

(65) Prior Publication Data

US 2003/0217115 A1    Nov. 20, 2003

Related U.S. Application Data

(63) Continuation-in-part of application No. 10/270,028, filed on Oct. 11, 2002.

(60) Provisional application No. 60/380,740, filed on May 15, 2002.

(51) Int. Cl.
*G06F 12/00* (2006.01)
(52) U.S. Cl. ...................................................... 711/141
(58) Field of Classification Search ................ 709/214; 711/141
See application file for complete search history.

(56) References Cited

U.S. PATENT DOCUMENTS

| | | |
|---|---|---|
| 4,433,378 A | 2/1984 | Leger |
| 4,463,424 A | 7/1984 | Mattson et al. |
| 4,760,571 A | 7/1988 | Schwarz |
| 5,640,399 A | 6/1997 | Rostoker et al. |
| 5,668,809 A | 9/1997 | Rostoker et al. |
| 5,742,780 A | 4/1998 | Caulk, Jr. |
| 5,778,414 A | 7/1998 | Winter et al. |
| 5,802,287 A | 9/1998 | Rostoker et al. |
| 5,829,025 A | 10/1998 | Mittal |
| 5,887,187 A | 3/1999 | Rostoker et al. |
| 5,893,150 A | 4/1999 | Hagersten et al. |
| 5,908,468 A | 6/1999 | Hartmann |

(Continued)

FOREIGN PATENT DOCUMENTS

WO    WO 00/30322    5/2000

(Continued)

OTHER PUBLICATIONS

EP Search Report for EP app. 03010853.4, Aug. 18, 2003, Broadcom Corp.

(Continued)

*Primary Examiner*—Pierre Bataille
*Assistant Examiner*—Sheng-Jen Tsai
(74) *Attorney, Agent, or Firm*—Garlick Harrison & Markison

(57) ABSTRACT

A node includes a processor coupled to an interconnect and a memory bridge coupled to the interconnect. The processor is configured to maintain a first indication of whether or not a modification of data at a first address has been detected by the processor after a most recent load-linked (LL) instruction was executed by the processor to the first address. The memory bridge is responsible for internode coherency within the node, and is configured to initiate a first transaction on the interconnect in response to receiving a probe command from another node. The processor is configured, during a time period in which the processor has a second transaction outstanding to the first address, to change the first indication to the first state responsive to the first transaction.

11 Claims, 13 Drawing Sheets

U.S. PATENT DOCUMENTS

| | | | |
|---|---|---|---|
| 5,914,955 | A | 6/1999 | Rostoker et al. |
| 5,974,508 | A | 10/1999 | Maheshwari |
| 6,018,763 | A | 1/2000 | Hughes et al. |
| 6,021,451 | A | 2/2000 | Bell et al. |
| 6,092,137 | A | 7/2000 | Huang et al. |
| 6,098,064 | A | 8/2000 | Pirolli et al. |
| 6,111,859 | A | 8/2000 | Godfrey et al. |
| 6,128,706 | A | 10/2000 | Bryg et al. |
| 6,151,662 | A | 11/2000 | Christie et al. |
| 6,157,623 | A | 12/2000 | Kerstein |
| 6,202,125 | B1 | 3/2001 | Patterson et al. |
| 6,202,129 | B1 | 3/2001 | Palanca et al. |
| 6,209,020 | B1 | 3/2001 | Angle et al. |
| 6,215,497 | B1 | 4/2001 | Leung |
| 6,249,843 | B1 | 6/2001 | Arimilli et al. |
| 6,262,594 | B1 | 7/2001 | Cheung et al. |
| 6,266,797 | B1 | 7/2001 | Godfrey et al. |
| 6,269,427 | B1 | 7/2001 | Kuttanna et al. |
| 6,279,087 | B1 | 8/2001 | Melo et al. |
| 6,321,309 | B1 | 11/2001 | Bell et al. |
| 6,332,179 | B1 | 12/2001 | Okpisz et al. |
| 6,349,365 | B1 | 2/2002 | McBride |
| 6,366,583 | B2 | 4/2002 | Rowett et al. |
| 6,373,846 | B1 | 4/2002 | Daniel et al. |
| 6,438,651 | B1 | 8/2002 | Slane |
| 6,460,124 | B1 * | 10/2002 | Kagi et al. .................. 711/163 |
| 6,574,708 | B2 | 6/2003 | Hayter et al. |
| 6,748,501 | B2 * | 6/2004 | Arimilli et al. ............. 711/155 |
| 6,799,236 | B1 * | 9/2004 | Dice et al. .................. 710/200 |
| 6,801,986 | B2 * | 10/2004 | Steely et al. ................ 711/152 |
| 2001/0052053 | A1 | 12/2001 | Nemirovsky et al. |

FOREIGN PATENT DOCUMENTS

| | | |
|---|---|---|
| WO | WO 00/52879 | 9/2000 |

OTHER PUBLICATIONS

SiByte; "Target Applications" http://sibyte.com/mercurian.applications.htm; Jan. 15, 2001; 2 pages.

SiByte; "SiByte Technology" http://sibyte.com/mercurian/technology.htm; Jan. 15, 2001; 3 pages.

SiByte; "The Mercurian Processor" http://sibyte.com/mercurian; Jan. 15, 2001; 2 pages.

SiByte; "Fact Sheet, SB-1 CPU" Oct. 2000; 1 page.

SiByte; "Fact Sheet, SB-1250" Oct. 2000; 10 pages.

Stepanian; "SiByte Sb-1 MIPS64 CPU Core" Embedded Processo Forum 2000; Jun. 13, 2000, 15 pages.

Keller; "The Mercurian Processor: A High Performance, Power-efficient CMP for Networking" Oct. 10, 2000; 22 pages.

Saulsbury et al.; "An Argument for Simple COMA" SICS Research Report No. R94:15; Aug. 1, 1994; 20 pages.

Lenoski; "The Design And Analysis Of Dash: A Scalable Directory-Based Multiprocessor" Dissertation-Stanford University; Dec. 1991; 176 pages.

"21143 PCI/Card bus 10/100Mb/s Ethernet LAN Controller" Hardware Reference Manual; Intel Corp.; Oct. 1998.

"Pentium Pro Family Developer's Manual, vol. 1: Specifications" Intel Corporation; 1996; pp. 4-1 to 4-18.

"PowerPC 601, RISC Microprocessor User's Manual" MPC601UM/AD; 1993; 1 page.

"Pentium Processor Family User's Manual, vol. 1: Pentium Processor Family Data Book"; Intel Corp.; 1994; 2 pages.

Katevenis et al.; "ATLAS I; a single-chip, gigabit ATM switch with HIC/HS links and multi-lane back-pressure" Microprocessors and Microsystems; 1998; pp. 481-490.

Halfhill; "SiByte Reveals 64-Bit Core For NPUs, Independent MIPS64 Design Combines Low Power, High Performance" Microdesign Resources; Jun. 2000, 4 pages.

U.S. Appl. No. 09/680,524, filed Oct. 6, 2000; Rowlands et al.; "Source Triggered Transaction Blocking".

U.S. Appl. No. 09/829,514, filed Apr. 9, 2001; Kruckemyer et al.; "Cache Coherent Protocol In Which Exclusive . . . ".

U.S. Appl. No. 10/413,917, filed Apr. 15, 2003; Rowlands et al.; "Cache Programmable To Partition Ways To Agents . . . ".

U.S. Appl. No. 10/269,922, filed Oct. 11, 2002; Sano et al.; "Systems Using Mix of Packet, Coherent, and Noncoherent . . . ".

U.S. Appl. No. 10/270,028, filed Oct. 11, 2002; Rowlands; "System Having interfaces, Switch, And Memory Bridge . . . ".

U.S. Appl. No. 10/269,827, filed Oct. 11, 2002; Rowlands et al.; "Remote Line Directory Which Covers Subset of . . . ".

U.S. Appl. No. 10/269,828, filed Oct. 11, 2002; Rowlands; "L2 Cache Maintaining Local Ownership Of . . . ".

U.S. Appl. No. 10/270,480, filed Oct. 11, 2002; Rowlands; "System Having Address-Based Intranode Coherency and . . . ".

* cited by examiner

Interconnect Transactions

| Transaction |
|---|
| RdShd |
| RdExc |
| Wr |
| WrInv |
| RdKill |
| RdInv |
| WrFlush |
| Nop |

— 42

HTcc Commands

| Command | Virtual Channel |
|---|---|
| cRdShd | CRd |
| cRdExc | CRd |
| Flush | Probe |
| Kill | Probe |
| Kill_Ack | Ack |
| WB | Ack |
| Fill | CFill |

LOAD-LINKED/STORE CONDITIONAL MECHANISM IN A CC-NUMA SYSTEM

This application claims benefit of priority to U.S. Provisional Patent Application Ser. No. 60/380,740, filed May 15, 2002. This application is a continuation in part of U.S. patent application Ser. No. 10/270,028, filed on Oct. 11, 2002.

BACKGROUND OF THE INVENTION

1. Field of the Invention

This invention is related to processors and, more particularly, to synchronization mechanisms for multiprocessor systems.

2. Description of the Related Art

Processors designed for use in multiprocessing systems typically support some sort of mechanism for synchronizing processes executing on the various processors. For example, certain sections of code may be designated as "critical sections". Critical sections may update variables shared by the processes, read or write files, etc. Typically, the processes are synchronized such that at most one process at any given time is executing the critical section. As another example, the processes may share certain data areas in memory. Access to the shared data areas may be controlled in a similar fashion, synchronizing such that at most one process has access (or perhaps at most one process has write access, with other processes possibly having read-only access) to the shared data area at any given time.

Support for synchronization has been provided by processors in the form of an atomic read-modify-write of a memory location. The atomic read-modify-write can be used to implement various synchronization primitives such as test and set, exchange, fetch and add, compare and swap, etc. Synchronization may be managed by using atomic read-modify-writes to designated memory locations to communicate whether or not a critical section or shared data area is available, to indicate which process currently has access to the critical section or shared data area, etc. The designated memory locations are often referred to as "semaphores".

Some processors may support atomic read-modify-writes using a lock mechanism. With a lock mechanism, when a processor accesses a memory location, other access to that memory location is prevented until the processor releases the lock. The atomicity of the read-modify-write operation to the memory location is guaranteed by preventing other processors from accessing that memory location. Lock mechanisms may be problematic in practice. For example, if the lock is implemented by locking a resource for accessing memory (e.g. a shared bus), deadlock may result (especially in coherent systems). Lock mechanisms for larger systems (e.g. multiple levels of interconnect between processors) may be problematic to implement.

Another approach for providing an atomic read-modify-write mechanism is the load-linked/store conditional mechanism. In this mechanism, two types of instructions are provided: the load-linked and the store conditional. Generally, a load-linked instruction and a store conditional instruction to the same address are used in pairs. The load-linked instructions operate similar to typical load instructions, but also cause the processor to monitor the target address of the load instruction (the address of the data accessed by the load). The store conditional instruction conditionally stores to the target address based on whether or not the target address is updated by another processor/device between the load-linked instruction and the store conditional instruction. Other conditions may cause the store not to occur as well. The store conditional may provide an indication of whether or not the store was performed, which may be tested by subsequent instructions to either branch back to the load-linked instruction to attempt the read-modify-write operation again (if the store was not successfully performed) or to continue processing (if the store was successfully performed). With the load-linked/store conditional mechanism, other processors may access the memory location for which the atomic read-modify-write is being attempted. If a modification occurs, the load-linked/store conditional sequence is repeated. When the store conditional completes successfully, an atomic read-modify-write of the location has been performed.

Processors and other devices which couple to a shared interconnect may use the order of transactions on the interconnect to determine the order in which processors/devices update the memory location targeted by a load-linked/store conditional pair. For example, if various processors have a shared copy of the data at the memory location (read via the load-linked instruction), a first processor may perform a transaction to the memory location on the interconnect in response to the store conditional instruction (to gain exclusive access). Since the transaction occurs before transactions by other processors/devices, the first processor should update the memory location (i.e. complete its store conditional instruction successfully). Other processors may perform transactions to gain exclusive access to the memory location before the first processor completes the store conditional instruction (e.g. the first processor may be waiting to receive data for the transaction that provides the first processor with exclusive access). To prevent the store conditional from failing, the first processor may delay the effects of state changes in response to the other processors' transactions until after the outstanding transaction by the first processor is completed. Such action may also be used to guarantee forward progress in general (e.g. permitting a processor to use the data at least once before passing the data on to a subsequent-accessing processor in response to a snoop).

While the above mechanism may provide proper operation in a system in which the interconnect is the only ordering point, the above mechanism may not function properly if the processors/devices and interconnect are one node of a multinode system (e.g. a distributed shared memory system). In a multinode system, a processor in each node may perform the transaction to obtain exclusive access to the memory location at about the same time. Internode communications may be used to maintain coherency across the nodes, and the internode communications may result in transactions on the interconnect in each node. However, the effects of these transactions would be delayed until the outstanding transactions in each of the above processors completed. Thus, one processor in each node may determine that it has successfully completed a store conditional to the same memory location, and the synchronization among the multiple nodes would be lost.

SUMMARY OF THE INVENTION

In one embodiment, a node may include a processor coupled to an interconnect and a memory bridge coupled to the interconnect. The processor is configured to maintain a first indication of whether or not a modification of data at a first address has been detected by the processor after a most recent load-linked (LL) instruction was executed by the processor to the first address. The first indication being in a first state that indicates that the modification has been detected prevents a store conditional (SC) instruction executed on the processor from completing successfully. The memory bridge is responsible for internode coherency within the node, and is configured to initiate a first transaction on the interconnect in response to receiving a probe command from another node. The processor is configured, during a time period in which the processor has a second transaction outstanding to the first address, to change the first indication to the first state responsive to the first transaction.

In one implementation, a processor comprises a storage location and a control circuit coupled to receive transactions from an interconnect to which the processor is coupled during use. The storage location is configured to store a first address and a first indication corresponding to the first address. The first indication is indicative of whether or not a modification of data at the first address has been detected by the processor after a most recent load-linked (LL) instruction was executed by the processor to the first address. If the first indication is in a first state that indicates that the modification has been detected, a store conditional (SC) instruction executed on the processor is prevented from completing successfully. The control circuit is configured to distinguish between a first transaction initiated in response to a probe command from a different node than the node including the processor and a second transaction initiated by an agent within the node to modify the data at the first address. During a time period in which the processor has a third transaction outstanding to the first address, the control circuit is configured to cause the processor to change the first indication to the first state responsive to the first transaction but not to change the first indication responsive to the second transaction.

A method is contemplated for an embodiment. In a processor in a first node, a first transaction corresponding to a probe command received from a second node is detected during a time period that a second transaction is outstanding from the processor to a first address. The processor maintains a first indication indicative of whether or not a modification of data at a first address has been detected by the processor after a most recent load-linked (LL) instruction was executed by the processor to the first address, and the first indication being in a first state that indicates that the modification has been detected prevents a store conditional (SC) instruction executed on the processor from completing successfully. The first indication is changed to the first state during the time period responsive to the detecting.

BRIEF DESCRIPTION OF THE DRAWINGS

The following detailed description makes reference to the accompanying drawings, which are now briefly described.

FIG. 2 is a table illustrating an exemplary set of coherency commands and a table illustrating an exemplary set of transactions according to one embodiment of the node shown in FIG. 1.

Figure 1:
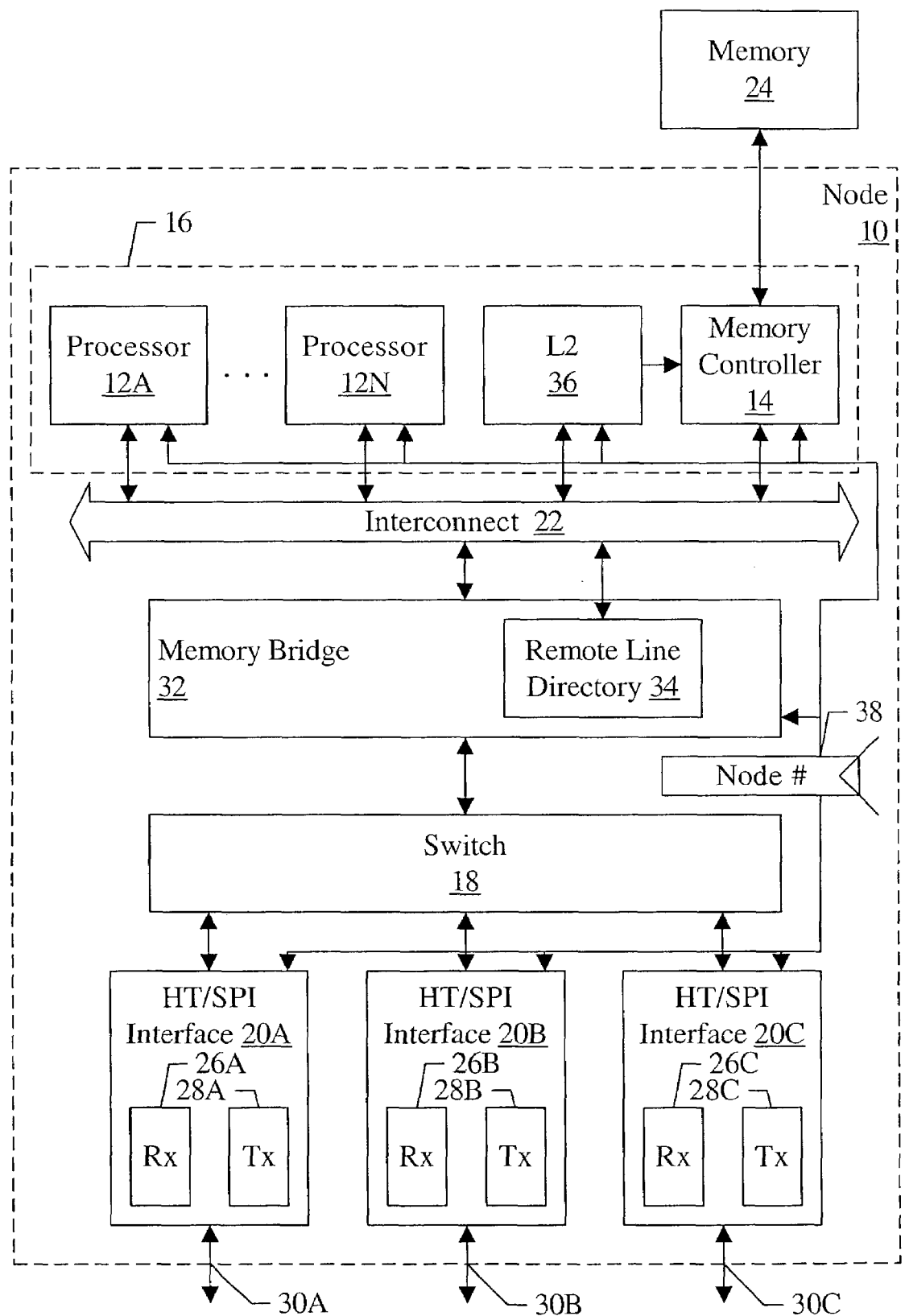
FIG. 1 is a block diagram of one embodiment of a node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Node Overview

Turning now to FIG. 1, a block diagram of one embodiment of a node 10 is shown. In the embodiment of FIG. 1, the node 10 includes one or more processors 12A-12N, a memory controller 14, a switch 18, a set of interface circuits 20A-20C, a memory bridge 32, and an L2 cache 36. The memory bridge 32 includes a remote line directory 34. The node 10 includes an interconnect 22 to which the processors 12A-12N, the memory controller 14, the L2 cache 36, the memory bridge 32, and the remote line directory 34 are coupled. The node 10 is coupled, through the memory controller 14, to a memory 24. The interface circuits 20A-20C each include a receive (Rx) circuit 26A-26C and a transmit (Tx) circuit 28A-28C. The node 10 is coupled to a set of interfaces 30A-30C through respective interface circuits 20A-20C. The interface circuits 20A-20C are coupled to the switch 18, which is further coupled to the memory bridge 32. A configuration register 38 is also illustrated in FIG. 1, which stores a node number (Node #) for the node 10. The configuration register 38 is coupled to the L2 cache 36, the memory controller 14, the memory bridge 32, and the interface circuits 20A-20C in the embodiment of FIG. 1. Additionally, the processors 12A-12N may be coupled to receive the node number from the configuration register 38.

The node 10 may support intranode coherency for transactions on the interconnect 22. Additionally, the node 10 may support internode coherency with other nodes (e.g. a CC-NUMA coherency, in one embodiment). Generally, as used herein, a memory bridge includes circuitry designed to handle internode coherency functions within a node. Particularly, in one embodiment, if a transaction on the interconnect 22 (e.g. a transaction issued by the processors 12A-12N) accesses a cache block that is remote to the node 10 (i.e. the cache block is part of the memory coupled to a different node) and the node 10 does not have sufficient ownership to perform the transaction, the memory bridge 32 may issue one or more coherency commands to the other nodes to obtain the ownership (and a copy of the cache block, in some cases). Similarly, if the transaction access a local cache block but one or more other nodes have a copy of the cache block, the memory bridge 32 may issue coherency commands to other nodes. Still further, the memory bridge 32 may receive coherency commands from other nodes, and may perform transactions on the interconnect 22 to effect the coherency commands.

In one embodiment, a node such as node 10 may have memory coupled thereto (e.g. memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 32 in the remote node, for example, may detect a transaction on the interconnect 22 that accesses the cache block and may detect that the remote node does not have sufficient ownership of the cache block to complete the transaction (e.g. it may not have a copy of the cache block at all, or may have a shared copy and may require exclusive ownership to complete the transaction). The memory bridge 32 in the remote node may generate and transmit the coherency command to the home node to obtain the copy or to obtain sufficient ownership. The memory bridge 32 in the home node may determine if any state changes in other nodes are to be performed to grant the requested ownership to the remote node, and may transmit coherency commands (e.g. probe commands) to effect the state changes. The memory bridge 32 in each node receiving the probe commands may effect the state changes and respond to the probe commands. Once the responses have been received, the memory bridge 32 in the home node may respond to the remote node (e.g. with a fill command including the cache block).

The remote line directory 34 may be used in the home node to track the state of the local cache blocks in the remote nodes. The remote line directory 34 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain modified state for the cache block. In the invalid state, the node may not read or write the cache block (i.e. the node does not have a valid copy of the cache block). Other embodiments may use other coherency protocols (e.g. the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

Coherency commands are transmitted and received on one of the interfaces 30A-30C by the corresponding interface circuit 20A-20C. The interface circuits 20A-20C receive coherency commands for transmission from the memory bridge 32 and transmit coherency commands received from the interfaces 30A-30C to the memory bridge 32 for processing, if the coherency commands require processing in the node 10. In some embodiments, a coherency command may be received that is passing through the node 10 to another node, and does not require processing in the node 10. The interface circuits 20A-20C may be configured to detect such commands and retransmit them (through another interface circuit 20A-20C) without involving the memory bridge 32.

In the illustrated embodiment, the interface circuits 20A-20C are coupled to the memory bridge 32 through the switch 18 (although in other embodiments, the interface circuits 20A-20C may have direct paths to the memory bridge 32). The switch 18 may selectively couple the interface circuits 20A-20C (and particularly the Rx circuits 26A-26C in the illustrated embodiment) to other interface circuits 20A-20C (and particularly the Tx circuits 28A-28C in the illustrated embodiment) or to the memory bridge 32 to transfer received coherency commands. The switch 18 may also selectively couple the memory bridge 32 to the interface circuits 20A-20C (and particularly to the Tx circuits 28A-28C in the illustrated embodiment) to transfer coherency commands generated by the memory bridge 32 from the memory bridge 32 to the interface circuits 20A-20C for transmission on the corresponding interface 30A-30C. The switch 18 may have request/grant interfaces to each of the interface circuits 20A-20C and the memory bridge 32 for requesting transfers and granting those transfers. The switch 18 may have an input path from each source (the Rx circuits 26A-26C and the memory bridge 32) and an output path to each destination (the Tx circuits 28A-28C and the memory bridge 32), and may couple a granted input path to a granted output path for transmission of a coherency command (or a portion thereof, if coherency commands are larger than one transfer through the switch 18). The couplings may then be changed to the next granted input path and granted output path. Multiple independent input path/output path grants may occur concurrently.

In one embodiment, the interfaces 30A-30C may support a set of virtual channels in which commands are transmitted. Each virtual channel is defined to flow independent of the other virtual channels, even though the virtual channels may share certain physical resources (e.g. the interface 30A-30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received.

Generally speaking, a node may include one or more coherent agents (dotted enclosure 16 in FIG. 1). In the embodiment of FIG. 1, the processors 12A-12N, the L2 cache 36, and the memory controller 14 may be examples of coherent agents 16. Additionally, the memory bridge 32 may be a coherent agent (on behalf of other nodes). However, other embodiments may include other coherent agents as well, such as a bridge to one or more I/O interface circuits, or the I/O interface circuits themselves. Generally, an agent includes any circuit which participates in transactions on an interconnect. A coherent agent is an agent that is capable of performing coherent transactions and operating in a coherent fashion with regard to transactions. A transaction is a communication on an interconnect. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments.

Each of the interface circuits 20A-20C are configured to receive and transmit on the respective interfaces 30A-30C to which they are connected. The Rx circuits 26A-26C handle the receiving of communications from the interfaces 30A-30C, and the Tx circuits 28A-28C handle the transmitting of communications on the interfaces 30A-30C.

Each of the interfaces 30A-30C used for coherent communications are defined to be capable of transmitting and receiving coherency commands. Particularly, in the embodiment of FIG. 1, those interfaces 30A-30C may be defined to receive/transmit coherency commands to and from the node 10 from other nodes. Additionally, other types of commands may be carried. In one embodiment, each interface 30A-30C may be a HyperTransport™ (HT) interface, including an extension to the HT interface to include coherency commands (HTcc). Additionally, in some embodiments, an extension to the HyperTransport interface to carry packet data (Packet over HyperTransport, or PoHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc.

In some embodiments, one or more of the interface circuits 20A-20C may not be used for coherency management and may be defined as packet interfaces. Such interfaces 30A-30C may be HT interfaces. Alternative, such interfaces 30A-30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A-20C may be configurable to communicate on either the SPI-4 interface or the HIT interface. Each interface circuit 20A-20C may be individually programmable, permitting various combinations of the HT and SPI-4 interfaces as interfaces 30A-30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as PoHT).

In embodiments which also support packet traffic, the node 10 may also include a packet direct memory access (DMA) circuit configured to transfer packets to and from the memory 24 on behalf of the interface circuits 20A-20C. The switch 18 may be used to transmit packet data from the interface circuits 20A-20C to the packet DMA circuit and from the packet DMA circuit to the interface circuits 20A-20C. Additionally, packets may be routed from an Rx circuit 26A-26C to a Tx circuit 28A-28C through the switch 18, in some embodiments.

The processors 12A-12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The node 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A-12N may include internal (L1) caches. In other embodiments the L2 cache 36 may be an L1 cache, an L3 cache, or any other level as desired.

The memory controller 14 is configured to access the memory 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the node 10 may include additional circuitry, not shown in FIG. 1. For example, the node 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the node 10 (and more particularly the processors 12A-12N, the memory controller 14, the L2 cache 36, the interface circuits 20A-20C, the memory bridge 32 including the remote line directory 34, the switch 18, the configuration register 38, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A-20C are illustrated in FIG. 1, one or more interface circuits may be implemented in various embodiments. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

It is noted that the discussion herein may describe cache blocks and maintaining coherency on a cache block granularity (that is, each cache block has a coherency state that applies to the entire cache block as a unit). Other embodiments may maintain coherency on a different granularity than a cache block, which may be referred to as a coherency block. A coherency block may be smaller than a cache line, a cache line, or larger than a cache line, as desired. The discussion herein of cache blocks and maintaining coherency therefor applies equally to coherency blocks of any size.

Additional CC-NUMA Details, One Embodiment

FIGS. 2-6 illustrate additional details regarding one exemplary embodiment of a CC-NUMA protocol that may be employed by one embodiment of the node 10. The embodiment of FIGS. 2-6 is merely exemplary. Numerous other implementations of CC-NUMA protocols or other distributed memory system protocols may be used in other embodiments.

Turning next to FIG. 2, a table 42 is shown illustrating an exemplary set of transactions supported by one embodiment of the interconnect 22 and a table 44 is shown illustrating an exemplary set of coherency commands supported by one embodiment of the interfaces 30. Other embodiments including subsets, supersets, or alternative sets of commands may be used.

The transactions illustrated in the table 42 will next be described. An agent in the node 10 may read a cache block (either remote or local) using the read shared (RdShd) or read exclusive (RdExc) transactions on the interconnect 22. The RdShd transaction is used to request a shared copy of the cache block, and the RdExc transaction is used to request an exclusive copy of the cache block. If the RdShd transaction is used, and no other agent reports having a copy of the cache block during the response phase of the transaction (except for the L2 cache 36 and/or the memory controller 14), the agent may take the cache block in the exclusive state. In response to the RdExc transaction, other agents in the node invalidate their copies of the cache block (if any). Additionally, an exclusive (or modified) owner of the cache block may supply the data for the transaction in the data phase. Other embodiments may employ other mechanisms (e.g. a retry on the interconnect 22) to ensure the transfer of a modified cache block.

The write transaction (Wr) and the write invalidate transaction (WrInv) may be used by an agent to write a cache block to memory. The Wr transaction may be used by an owner having the modified state for the block, since no other copies of the block need to be invalidated. The WrInv transaction may be used by an agent that does not have exclusive ownership of the block (the agent may even have the invalid state for the block). The WrInv transaction causes other agents to invalidate any copies of the block, including modified copies. The WrInv transaction may be used by an agent that is writing the entire cache block. For example, a DMA that is writing the entire cache block with new data may use the transaction to avoid a read transaction followed by a write transaction.

The RdKill and RdInv transactions may be used by the memory bridge 32 in response to probes received by the node 10 from other nodes. The RdKill and RdInv transactions cause the initiator (the memory bridge 32) to acquire exclusive access to the cache block and cause any cache agents to invalidate their copies (transferring data to the initiator similar to the RdShd and RdExc transactions). In one embodiment, the RdKill transaction also cancels a reservation established by the load-linked instruction in the MIPS instruction set, while the RdInv transaction does not. In other embodiments, a single transaction may be used for probes. In still other embodiments, there may be a probe-generated transaction that invalidates agent copies of the cache block (similar to the RdKill and RdInv transactions) and another probe-generated transaction that permits agents to retain shared copies of the cache block.

The WrFlush transaction is a write transaction which may be initiated by an agent and another agent may have an exclusive or modified copy of the block. The other agent provides the data for the WrFlush transaction, or the initiating agent provides the data if no other agent has an exclusive or modified copy of the block. The WrFlush transaction may be used, in one embodiment as described above by the L2 cache 36.

The Nop transaction is a no-operation transaction. The Nop may be used if an agent is granted use of the interconnect 22 (e.g. the address bus, in embodiments in which the interconnect 22 is a split transaction bus) and the agent determines that it no longer has a transaction to run on the interconnect 22.

The commands illustrated in the table 44 will next be described. In the table 44, the command is shown as well as the virtual channel in which the command travels on the interfaces 30. The virtual channels may include, in the illustrated embodiment: the coherent read (CRd) virtual channel; the probe (Probe) virtual channel; the acknowledge (Ack) virtual channel; and coherent fill (CFill) virtual channel. The CRd, Probe, Ack, and CFill virtual channels are defined for the HTcc commands. There may be additional virtual channels for the standard HT commands (e.g. non-posted command (NPC) virtual channel, the posted command (PC) virtual channel, and the response (RSP) virtual channel).

The cRdShd or cRdExc commands may be issued by the memory bridge 32 in response to a RdShd or RdExc transactions on the interconnect 22, respectively, to read a remote cache block not stored in the node (or, in the case of RdExc, the block may be stored in the node but in the shared state). If the cache block is stored in the node (with exclusive ownership, in the case of the RdExc transaction), the read is completed on the interconnect 22 without any coherency command transmission by the memory bridge 32.

The Flush and Kill commands are probe commands for this embodiment. The memory bridge 32 at the home node of a cache block may issue probe commands in response to a cRdShd or cRdExc command. The memory bridge 32 at the home node of the cache block may also issue a probe command in response to a transaction for a local cache block, if one or more remote nodes has a copy of the cache block. The Flush command is used to request that a remote modified owner of a cache block return the cache block to the home node (and invalidate the cache block in the remote modified owner). The Kill command is used to request that a remote owner invalidate the cache block. In other embodiments, additional probe commands may be supported for other state change requests (e.g. allowing remote owners to retain a shared copy of the cache block).

The probe commands are responded to (after effecting the state changes requested by the probe commands) using either the Kill_Ack or WB commands. The Kill_Ack command is an acknowledgement that a Kill command has been processed by a receiving node. The WB command is a write back of the cache block, and is transmitted in response to the Flush command. The WB command may also be used by a node to write back a remote cache block that is being evicted from the node.

The Fill command is the command to transfer data to a remote node that has transmitted a read command (cRdExc or cRdShd) to the home node. The Fill command is issued by the memory bridge 32 in the home node after the probes (if any) for a cache block have completed.

Figure 3:
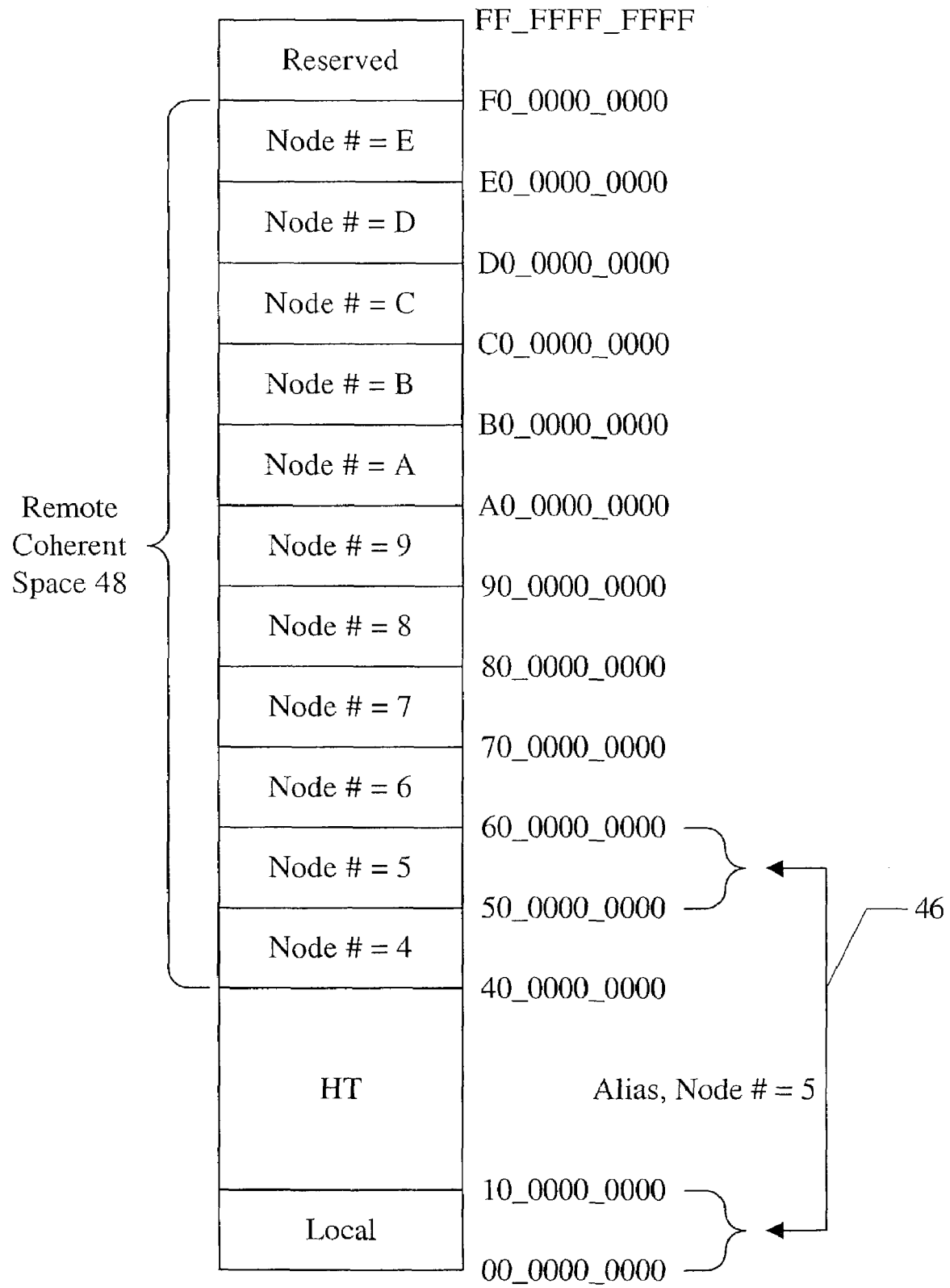
FIG. 3 is a block diagram of an address space supported by one embodiment of the node shown in FIG. 1.

Turning next to FIG. 3, a block diagram illustrating one embodiment of an address space implemented by one embodiment of the node 10 is shown. Addresses shown in FIG. 3 are illustrated as hexadecimal digits, with an under bar ("_") separating groups of four digits. Thus, in the embodiment illustrated in FIG. 3, 40 bits of address are supported. In other embodiments, more or fewer address bits may be supported.

In the embodiment of FIG. 3, the address space between 00_0000_0000 and 0F_FFFF_FFFF is treated as local address space. Transactions generated by agents in the local address space do not generate coherency commands to other nodes, although coherency may be enforced within the node 10 for these addresses. That is, the local address space is not maintained coherent with other nodes. Various portions of the local address space may be memory mapped to I/O devices, HT, etc. as desired.

The address space between 40_0000_0000 and EF_FFFF_FFFF is the remote coherent space 48. That is, the address space between 40_0000_0000 and EF_FFFF_FFFF is maintained coherent between the nodes. Each node is assigned a portion of the remote coherent space, and that node is the home node for the portion. As shown in FIG. 1, each node is programmable with a node number. The node number is equal to the most significant nibble (4 bits) of the addresses for which that node is the home node, in this embodiment. Thus, the node numbers may range from 4 to E in the embodiment shown. Other embodiments may support more or fewer node numbers, as desired. In the illustrated embodiment, each node is assigned a 64 Gigabyte (GB) portion of the memory space for which it is the home node. The size of the portion assigned to each node may be varied in other embodiments (e.g. based on the address size or other factors).

For a given coherent node, there is an aliasing between the remote coherent space for which that node is the home node and the local address space of that node. That is, corresponding addresses in the local address space and the portion of the remote coherent space for which the node is the home node access the same memory locations in the memory 24 of the node (or are memory mapped to the same I/O devices or interfaces, etc.). For example, the node having node number 5 aliases the address space 50_0000_0000 through 5F_FFFF_FFFF to 00_0000_0000 through 0F_FFFF_FFFF respectively (arrow 46). Internode coherent accesses to the memory 24 at the node 10 use the node-numbered address space (e.g. 50_0000_0000 to 5F_FFFF_FFFF, if the node number programmed into node 10 is 5) to access cache blocks in the memory 24. That is agents in other nodes and agents within the node that are coherently accessing cache blocks in the memory use the remote coherent space, while access in the local address space are not maintained coherent with other nodes (even though the same cache block may be accessed). Thus the addresses are aliased, but not maintained coherent, in this embodiment. In other embodiments, the addresses in the remote coherent space and the corresponding addresses in the local address space may be maintained coherent.

A cache block is referred to as local in a node if the cache block is part of the memory assigned to the node (as mentioned above). Thus, the cache block may be local if it is accessed from the local address space or the remote coherent space, as long as the address is in the range for which the node is the home node. Similarly, a transaction on the interconnect 22 that accesses a local cache block may be referred to as a local transaction or local access. A transaction on the interconnect 22 that accesses a remote cache block (via the remote coherent address space outside of the portion for which the node is the home node) may be referred to as a remote transaction or a remote access.

The address space between 10_0000_0000 and 3F_FFFF_FFFF may be used for additional HT transactions (e.g. standard HT transactions) in the illustrated embodiment. Additionally, the address space between F0_0000_0000 and FF_0000_0000 and FF_FFFF_FFFF may be reserved in the illustrated embodiment.

It is noted that, while the most significant nibble of the address defines which node is being accessed, other embodiments may use any other portion of the address to identify the node. Furthermore, other information in the transaction may be used to identify remote versus local transactions, in other embodiments (e.g. command type, control information transmitted in the transaction, etc.).

Figure 4:
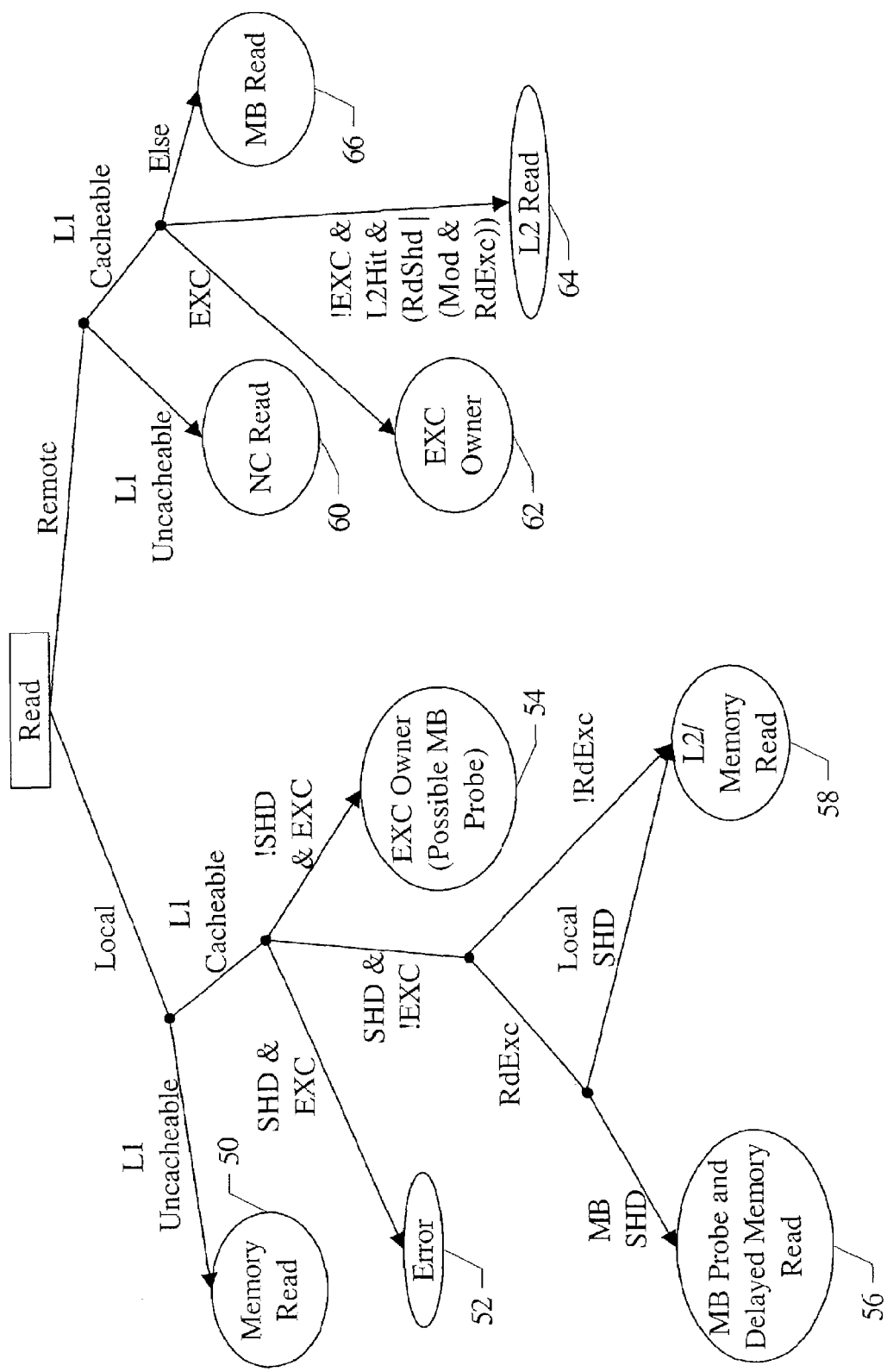
FIG. 4 is a decision tree illustrating operation of one embodiment of a node for a read transaction on the interconnect within the node.

Turning next to FIG. 4, a decision tree for a read transaction to a memory space address on the interconnect 22 of a node 10 is shown for one embodiment. The decision tree may illustrate operation of the node 10 for the read transaction for different conditions of the transaction, the state of the cache block accessed by the transaction, etc. The read transaction may, in one embodiment, include the RdShd, RdExc, RdKill, and RdInv transactions shown in the table 42 of FIG. 2. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 4, the exclamation point ("!") is used to indicate a logical NOT. Not shown in FIG. 4 is the state transition made by each coherent agent which is caching a copy of the cache block for the read transaction. If the read transaction is RdShd, the coherent agent may retain a copy of the cache block in the shared state. Otherwise, the coherent agent invalidates its copy of the cache block.

The transaction may be either local or remote, as mentioned above. For local transactions, if the transaction is uncacheable, then a read from the memory 24 is performed (reference numeral 50). In one embodiment, the transaction may include an indication of whether or not the transaction is cacheable. If the transaction is uncacheable, it is treated as a non-coherent transaction in the present embodiment.

If the local transaction is cacheable, the operation of the node 10 is dependent on the response provided during the response phase of the transaction. In one embodiment, each coherent agent responds with the state of the cache block in that agent. For example, each coherent agent may have an associated shared (SHD) and exclusive (EXC) signal. The agent may signal invalid state by deasserting both the SHD and EXC signals. The agent may signal shared state by asserting the SHD signal and deasserting the EXC signal. The agent may signal exclusive state (or modified state) by asserting the EXC signal and deasserting the SHD signal. The exclusive and modified states may be treated the same in the response phase in this embodiment, and the exclusive/modified owner may provide the data. The exclusive/modified owner may provide, concurrent with the data, an indication of whether the state is exclusive or modified. While each agent may have its own SHD and EXC signals in this embodiment (and the initiating agent may receive the signals from each other agent), in other embodiments a shared SHD and EXC signal may be used by all agents.

If both the SHD and EXC responses are received for the local transaction, an error has occurred (reference numeral 52). The memory controller may return a fatal error indication for the read transaction, in one embodiment. If the response is exclusive (SHD deasserted, EXC asserted) the exclusive owner provides the data for the read transaction on the interconnect 22 (reference numeral 54). If the exclusive owner is the memory bridge 32 (as recorded in the remote line directory 34), then a remote node has the cache block in the modified state. The memory bridge 32 issues a probe (Flush command) to retrieve the cache block from that remote node. The memory bridge 32 may supply the cache block returned from the remote node as the data for the read on the interconnect 22.

If the response is shared (SHD asserted, EXC deasserted), the local transaction is RdExc, and the memory bridge 32 is one of the agents reporting shared, then at least one remote node may have a shared copy of the cache block. The memory bridge 32 may initiate a probe (Kill command) to invalidate the shared copies of the cache block in the remote node(s) (reference numeral 56). In one embodiment, the data may be read from memory (or the L2 cache 36) for this case, but the transfer of the data may be delayed until the remote node(s) have acknowledged the probe. The memory bridge 32 may signal the memory controller 14/L2 cache 36 when the acknowledgements have been received. In one embodiment, each transaction may have a transaction identifier on the interconnect 22. The memory bridge 32 may transmit the transaction identifier of the RdExc transaction to the memory controller 14/L2 cache 36 to indicate that the data may be transmitted.

If the response is shared, the local transaction is RdExc, and the sharing agents are local agents (i.e. the memory bridge 32 does not report shared), then the L2 cache 36 or the memory controller 14 may supply the data, depending on whether or not there is an L2 hit for the cache block (reference numeral 58). Similarly, if the response is shared and the transaction is not RdExc, the L2 cache 36 or the memory controller 14 may supply the data dependent on whether or not there is an L2 hit for the cache block.

If the transaction is remote and uncacheable, then the memory bridge 32 may generate a noncoherent read command on the interfaces 30 to read the data. For example, a standard HT read command may be used (reference numeral 60). If the remote transaction is cacheable and the response on the interconnect 22 is exclusive, then the exclusive owner supplies the data for the read (reference numeral 62). If the remote transaction is cacheable, the response is not exclusive, the cache block is an L2 cache hit, and the transaction is either RdShd or the transaction is RdExc and the L2 cache has the block in the modified state, then the L2 cache 36 supplies the data for the read (reference numeral 64). Otherwise, the memory bridge 32 initiates a corresponding read command to the home node of the cache block (reference numeral 66).

Figure 5:
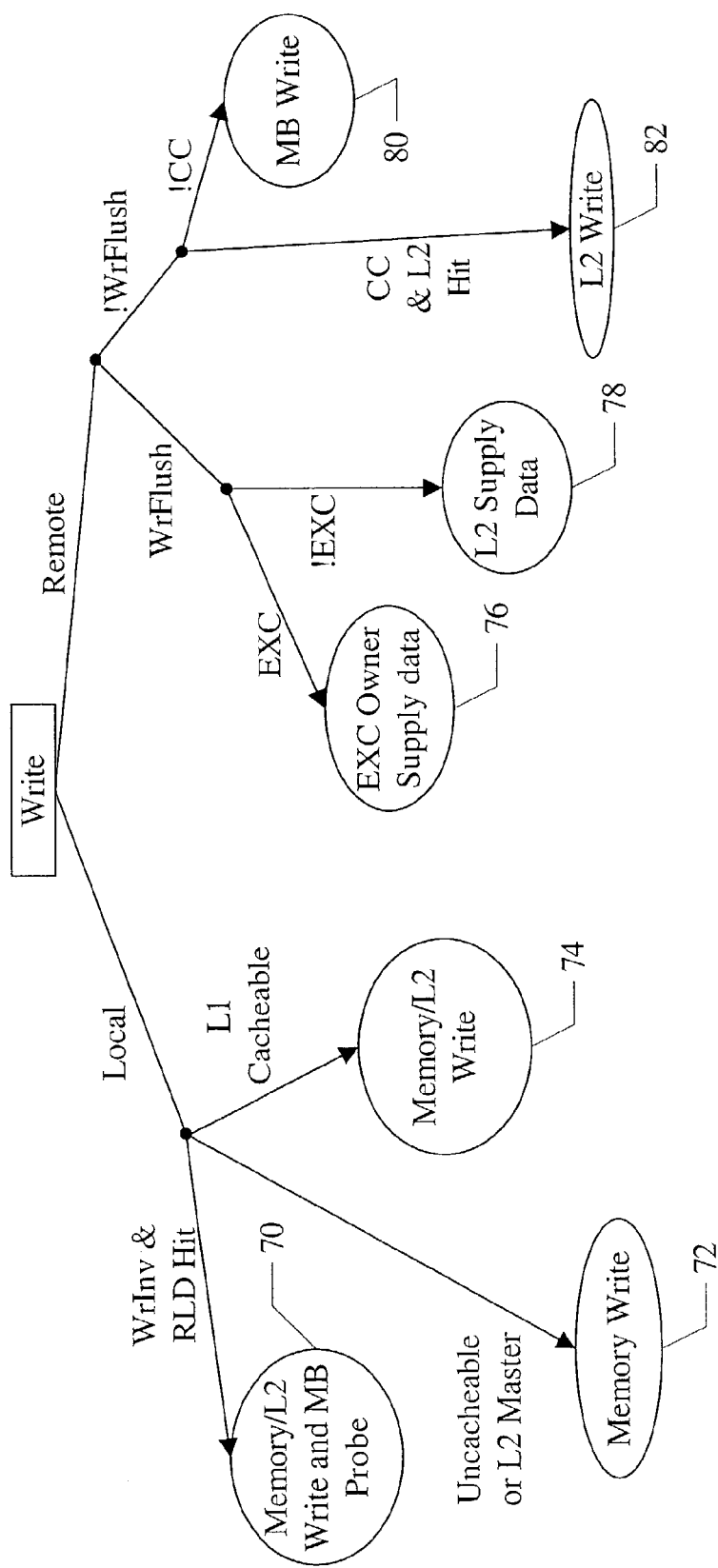
FIG. 5 is a decision tree illustrating operation of one embodiment of a node for a write transaction on the interconnect within the node.

Turning next to FIG. 5, a decision tree for a write transaction to a memory space address on the interconnect 22 of a node 10 is shown for one embodiment. The decision tree may illustrate operation of the node for the write transaction for different conditions of the transaction, the state of the cache block accessed by the transaction, etc. The write transaction may, in one embodiment, include the Wr, WrInv, and WrFlush transactions shown in the table 42 of FIG. 2. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 5, the exclamation point ("!") is used to indicate a logical NOT. Not shown in FIG. 5 is the state transition made by each coherent agent which is caching a copy of the cache block for the write transaction. The coherent agent invalidates its copy of the cache block.

If the transaction is a local transaction, and the transaction is a WrInv transaction that hits in the remote line directory 34 (i.e. a remote node is caching a copy of the cache block), the memory controller 14 (and the L2 cache 36, if an L2 hit) updates with the write data (reference numeral 70). Additionally, the memory bridge 32 may generate probes to the remote nodes indicated by the remote line directory 34. The update of the memory/L2 cache may be delayed until the probes have been completed, at which time the memory bridge 32 may transmit the transaction identifier of the WrInv transaction to the L2 cache 36/memory controller 14 to permit the update.

If the local transaction is uncacheable or if the L2 cache 36 is the master of the transaction (that is, the L2 cache 36 initiated the transaction), then the memory controller 14 updates with the data (reference numeral 72). If the local transaction is cacheable, the memory controller 14 and/or the L2 cache 36 updates with the data based on whether or not there is an L2 cache hit (and, in some embodiments, based on an L2 cache allocation indication in the transaction, which allows the source of the transaction to indicate whether or not the L2 cache allocates a cache line for an L2 cache miss) (reference numeral 74).

If the transaction is a remote transaction, the transaction is a WrFlush transaction, and the response to the transaction is exclusive, the exclusive owner supplies the data (reference numeral 76). If the remote WrFlush transaction results in a non-exclusive response (shared or invalid), the L2 cache 36 supplies the data of the WrFlush transaction. In one embodiment, the L2 cache 36 retains the state of the node as recorded in the home node, and the L2 cache 36 uses the WrFlush transaction to evict a remote cache block which is in the modified state in the node. Thus, if another agent has the cache block in the exclusive state, that agent may have a more recent copy of the cache block that should be returned to the home node. Otherwise, the L2 cache 36 supplies the block to be returned to the home node (reference numeral 78). In either case, the memory bridge 32 may capture the WrFlush transaction and data, and may perform a WB command to return the cache block to the home node.

If the remote transaction is not a WrFlush transaction, and is not cache coherent, the memory bridge 32 receives the write transaction and performs a noncoherent Wr command (e.g. a standard HT write) to transmit the cache block to the home node (reference numeral 80). If the remote transaction is not a WrFlush transaction, is cache coherent, and is an L2 hit, the L2 cache 36 may update with the data (reference numeral 82).

Figure 6:
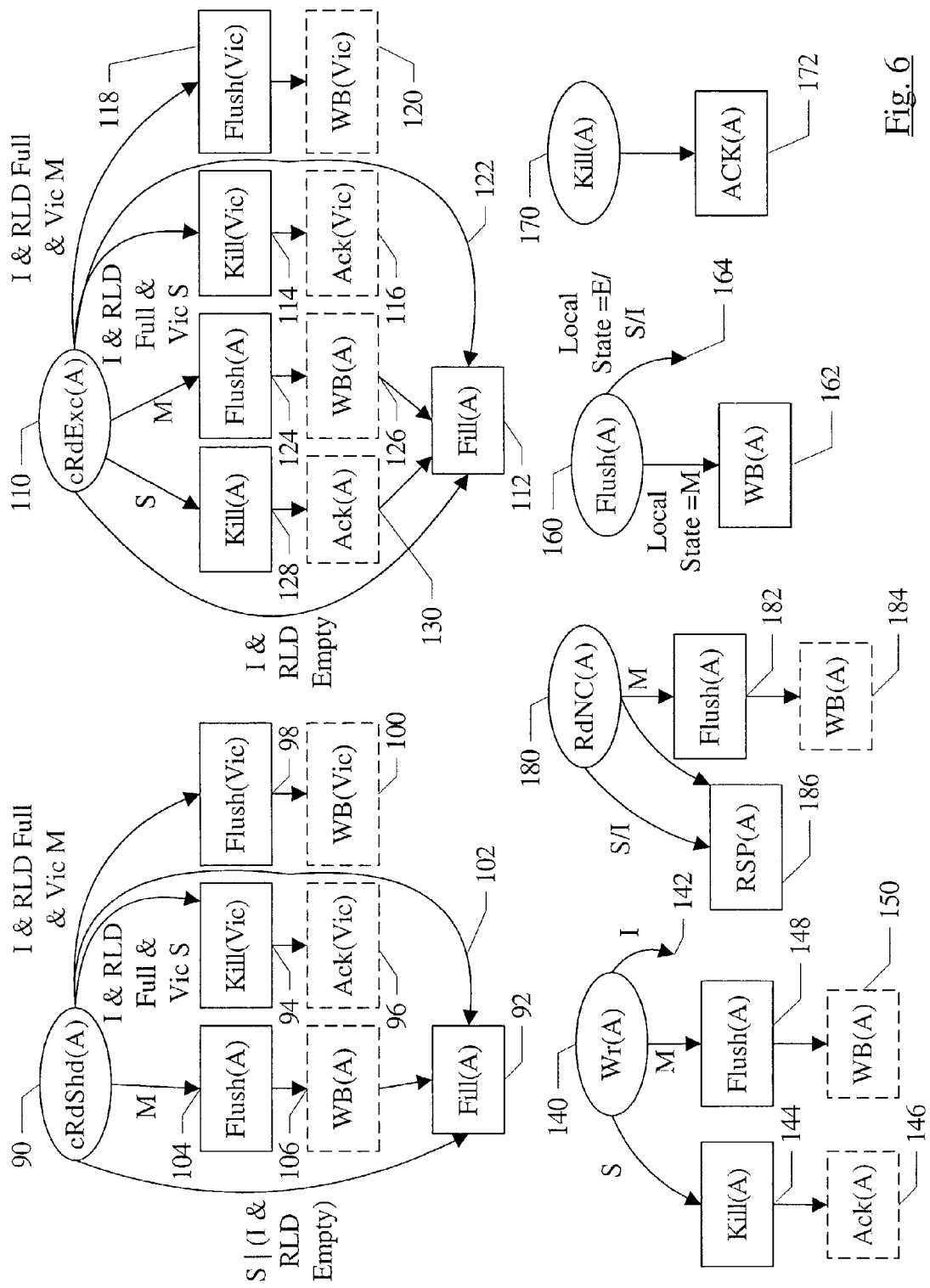
FIG. 6 is a diagram illustrating operation of one embodiment of the memory bridge for remote coherency commands received by the memory bridge.

Turning next to FIG. 6, a block diagram illustrating operation of one embodiment of the memory bridge 32 in response to various coherency commands received from the interface circuits 20A-20C is shown. The received command is shown in an oval. Commands initiated by the memory bridge 32 in response to the received command (and the state of the affected cache block as indicated in the remote line directory 34) are shown in solid boxes. Dotted boxes are commands received by the memory bridge 32 in response to the commands transmitted in the preceding solid boxes. The cache block affected by a command is shown in parentheses after the command.

In one embodiment, the remote line directory 34 may be accessed in response to a transaction on the interconnect 22. In such an embodiment, the memory bridge 32 may initiate a transaction on the interconnect 22 in response to certain coherent commands in order to retrieve the remote line directory 34 (as well as to affect any state changes in the coherent agents coupled to the interconnect 22, if applicable). In other embodiments, the memory bridge 32 may be configured to read the remote line directory 34 prior to generating a transaction on the interconnect 22, and may conditionally generate a transaction if needed based on the state of the remote line directory 34 for the requested cache block. Additionally, in one embodiment, the remote line directory 34 may maintain the remote state for a subset of the local cache blocks that are shareable remotely (e.g. a subset of the portion of the remote coherent space 48 that is assigned to the local node). If a cache block is requested by a remote node using a coherency command and there is no entry in the remote line directory 34 for the cache block, then a victim cache block may be replaced in the remote line directory 34 (and probes may be generated to invalidate the victim cache block in remote nodes). In other embodiments, the remote line directory 34 may be configured to track the state of each cache block in the portion of the remote coherent space 48 that is assigned to the local node. In such embodiments, operations related to the victim cache blocks may be omitted from FIG. 6.

For a cRdShd command for cache block "A" received by the memory bridge 32 (reference numeral 90), the memory bridge 32 may generate a RdShd transaction on the interconnect 22. Based on the remote line directory (RLD) state for the cache block A, a number of operations may occur. If the RLD state is shared, or invalid and there is an entry available for allocation without requiring a victim cache block to be evicted ("RLD empty" in FIG. 6), then the memory bridge 32 may transmit a fill command to the remote node with the data supplied to the memory bridge 32 in response to the RdShd transaction on the interconnect 22 (reference numeral 92). On the other hand, if the RLD state is invalid and an eviction of a victim block is used to free an RLD entry for cache block A, then the memory bridge 32 may transmit probes to the remote nodes having copies of the victim cache block. If the victim cache block is shared, the memory bridge 32 may transmit a Kill command (or commands, if multiple nodes are sharing the victim cache block) for the victim block (reference numeral 94). The remote nodes respond with Kill_Ack commands for the victim block (reference numeral 96). If the victim block is modified, the memory bridge 32 may transmit a Flush command to the remote node having the modified state (reference numeral 98). The remote node may return the modified block with a WB command (reference numeral 100). In either case of evicting a victim block, the memory bridge 32 may, in parallel, generate a Fill command for the cache block A (reference numeral 92, via arrow 102). Finally, if the RLD state is modified for the cache block A, the memory bridge 32 may generate a Flush command for the cache block A to the remote node (reference numeral 104), which responds with a WB command and the cache block A (reference numeral 106). The memory bridge 32 may then transmit the Fill command with the cache block A provided via the write back command (reference numeral 92).

In response to a cRdExc command for a cache block A (reference numeral 110), operation may be similar to the cRdShd case for some RLD states. Similar to the cRdShd case, the memory bridge 32 may initiate a RdExc transaction on the interconnect 22 in response to the cRdExc command. Similar to the cRdShd case, if the RLD is invalid and no eviction of a victim cache block is needed in the RLD to allocate an entry for the cache block A, then the memory bridge 32 may supply the cache block supplied on the interconnect 22 for the RdExc transaction in a fill command to the remote node (reference numeral 112). Additionally, if the RLD state is invalid for the cache block A and a victim cache block is evicted from the RLD 34, the memory bridge 32 may operate in a similar fashion to the cRdShd case (reference numerals 114 and 116 and arrow 122 for the shared case of the victim block and reference numerals 118 and 120 and arrow 122 for the modified case of the victim block). If the RLD state is modified for the cache block A, the memory bridge 32 may operate in a similar fashion to the cRdShd case (reference numerals 124 and 126). If the RLD state is shared for the cache block A, the memory bridge 32 may generate Kill commands for each remote sharing node (reference numeral 128). The memory bridge 32 may wait for the Kill_Ack commands from the remote sharing nodes (reference numeral 130), and then transmit the Fill command with the cache block A provided on the interconnect 22 in response to the RdExc transaction (reference numeral 112).

In response to a Wr command to the cache block A, the memory bridge 32 may generate a Wr transaction on the interconnect 22 (reference numeral 140). If the RLD state is invalid for the cache block A, the memory bridge 32 may transmit the write data on the interconnect 22 and the Wr command is complete (reference numeral 142). If the RLD state is shared for the cache block A, the memory bridge 32 may generate Kill commands to each remote sharing node (reference numeral 144) and collect the Kill_Ack commands from those remote nodes (reference numeral 146) in addition to transmitting the data on the interconnect 22. If the RLD state is modified for a remote node, the memory bridge 32 may generate a Flush command to the remote node (reference numeral 148) and receive the WB command from the remote node (reference numeral 150). In one embodiment, the memory bridge 32 may delay transmitting the write data on the interconnect 22 until the WB command or Kill_Ack commands are received (although the data returned with the WB command may be dropped by the memory bridge 32).

The above commands are received by the memory bridge 32 for cache blocks for which the node 10 including the memory bridge 32 is the home node. The memory bridge 32 may also receive Flush commands or Kill commands for cache blocks for which the node 10 is a remote node. In response to a Flush command to the cache block A (reference numeral 160), the memory bridge 32 may initiate a RdInv transaction on the interconnect 22. If the local state of the cache block is modified, the memory bridge 32 may transmit a WB command to the home node, with the cache block supplied on the interconnect 22 in response to the RdInv transaction (reference numeral 162). If the local state of the cache block is not modified, the memory bridge 32 may not respond to the Flush command (reference numeral 164). In this case, the node may already have transmitted a WB command to the home node (e.g. in response to evicting the cache block locally). In response to a Kill command to the cache block A (reference numeral 170), the memory bridge 32 may initiate a RdKill transaction on the interconnect 22. The memory bridge 32 may respond to the Kill command with a Kill_Ack command (reference numeral 172).

In one embodiment, the memory bridge 32 may also be configured to receive a non-cacheable read (RdNC) command (e.g. corresponding to a standard HT read) (reference numeral 180). In response, the memory bridge 32 may initiate a RdShd transaction on the interconnect 22. If the RLD state is modified for the cache block including the data to be read, the memory bridge 32 may transmit a Flush command to the remote node having the modified cache block (reference numeral 182), and may receive the WB command from the remote node (reference numeral 184). Additionally, the memory bridge 32 may supply data received on the interconnect 22 in response to the RdShd transaction as a read response (RSP) to the requesting node (reference numeral 186).

LL/SC Mechanism

A mechanism for implementing the load-linked(LL)/store conditional(SC) instructions in a system including multiple nodes 10 will next be described. The LL and SC instructions from the MIPS instruction set will be used as an example. However, other embodiments may implement other instruction sets, including other examples of a load-linked and store conditional instruction. The details of the instructions may vary. For example, the PowerPC instruction set includes load-linked instructions (lwarx or ldarx) and store conditional instructions (stwcx. and stdcx.). The PowerPC store conditional instructions report the success or failure of the conditional store in a condition code register. In contrast, the SC instruction in the MIPS instruction set reports the success or failure by writing a one or a zero (respectively) to the register sourcing the store data for the SC instruction. The description below, using the MIPS instructions as an example, applies equally to any instruction set that implements load-linked and store conditional instructions.

Generally, as used herein, a "load-linked" instruction is a load instruction which is architecturally defined to cause the processor to monitor the target address of the load for modification by other processors/devices. For example, the processor may store the target address in a register, and may set an indication to a state indicating that no modification has yet been attempted. If a modification is detected (e.g. via a snooping mechanism, a probe mechanism, etc.), the processor may change the indication to another state indicating that a modification has been detected. The processor may also change the indication to the state indicating modification in response to successfully completing a store conditional instruction. The indication is sometimes referred to as a reservation for the target address. In the examples described below, an LL bit is used as the indication. The set state of the LL bit may be the state indicating that no modification has been detected, and the clear state may indicate that a modification has been detected. The opposite meanings of the set and clear states may be used in other embodiments as well.

As used herein, a "store conditional" instruction is a store instruction which is architecturally defined to perform the store conditionally dependent on the indication set by the load-linked instruction. Specifically, the store is performed (the memory location specified by the target address of the store is updated) if the indication is in the state indicating that no modification has been detected and the store is not performed (the memory location specified by the target address of the store is not updated) if the indication is in the state indicating that modification has been detected. As mentioned above, the SC instruction of the MIPS instruction set and the conditional store word (stcwx.) and a conditional store doubleword (stcdx.) instructions of the PowerPC instruction may be examples of a store conditional instruction. In some embodiments, the store conditional instruction may report the success or failure of the store (e.g. by updating the source register for the store conditional instruction, a condition code register, or other mechanisms).

In various embodiments, the granularity for which the processor detects modification may be varied. For example, the granularity may be the size of the data accessed (e.g. a word), or may be a larger granularity (e.g. a cache block or coherency block containing the word). If a larger granularity is used, updates to the target address or to other addresses within the granularity may cause the indication to change state. Any granularity may be used in various embodiments. Addresses may be viewed as the same, or transactions may be viewed as being to the same address, if the addresses are the same within the implemented granularity (e.g. the addresses identify bytes within the same cache block or coherency block). Addresses may be viewed as different, or transactions may be viewed as being to different addresses, if the addresses are different at the implemented granularity (e.g. the addresses identify bytes within different cache blocks or coherency blocks).

An example implementation using the LL/SC instructions will next be described. As mentioned above, the example may be used for any load-linked/store conditional instructions. Generally, the processors 12A-12N may be configured to distinguish between: (i) transactions initiated by agents to coherently obtain access to the data corresponding to an address being monitored by the processor due to a previously executed LL instruction; and (ii) transactions initiated by the memory bridge 32 to the address in response to probes received from a home node. Effects on the LL bit for the first case (i) may be delayed, if a transaction is outstanding from the processor at the time the case (i) transaction is snooped, until the outstanding transaction is completed. On the other hand, effects on the LL bit for the second case (ii) may occur prior to the outstanding transaction completing (that is, during a time period while the transaction is still outstanding). The probes may be transmitted by the home node to grant exclusive access to a node other than the node including the processor 12A-12N. Thus, even if the processor 12A-12N is the first to request exclusive access within the node, the processor is not the first to be granted exclusive access among the multiple nodes. By changing the state of the LL bit while the transaction is still outstanding, the SC instruction that caused the transaction (which is checked again when the transaction is completing to determine if the SC instruction can be completed) will not complete successfully.

The memory bridge 32 may be configured to initiate a transaction on the interconnect 22 in response to a probe that is different from the transactions initiated by the agents on the interconnect 22 to coherently obtain access to data. Thus, the processor 12A-12N may distinguish probe-generated transactions from other transactions by the type of transaction that is transmitted. For example, for the embodiment illustrated in FIGS. 2-6, the RdShd and RdExc transactions are used to obtain access to data, and the RdKill transaction is used for the Kill probe (which is issued by the home node to invalidate shared copies of the data in response to a request for exclusive access at the home node). Thus, when the processor 12A-12N snoops a RdShd or RdExc, any effects on the LL bit are delayed until an outstanding transaction to the same address is completed. When the processor 12A-12N snoops a RdKill transaction, the LL bit is updated even if there is an outstanding transaction.

In the illustrated embodiment, there is also a different transaction encoding used in response to Flush probes (the RdInv transaction). In one embodiment, the processor 12A-12N may treat the RdInv transaction similar to the RdShd or RdExc transactions, with regard to modifying the LL bit. In this manner, the SC instruction may complete successfully even if a subsequent request at the home node causes a Flush probe, and the Flush probe is received by the node prior to the Fill that provides the data for update by the SC instruction. Other embodiments may not distinguish between the probe types, and may change the state of the LL bit in either case.

While the above discussion refers to delaying effects on the LL bit for various transactions, in general the processor 12A-12N may delay any state changes in the processor (e.g. coherency state changes in the cache) until the outstanding transaction completes. Generally, a transaction is "outstanding" if the transaction has been initiated on the interconnect 22 and has obtained ownership of the coherency block addressed by the transaction, but has not yet received the block. As used herein, a "probe" or "probe command" refers to any operation initiated to cause a coherent device that receives the probe to change its coherency state for a cache block and to possibly transmit the cache block back to the initiator of the probe. For example, the Kill and Flush coherency commands may be probes in the embodiment illustrated via FIGS. 2-6.

Figure 7:
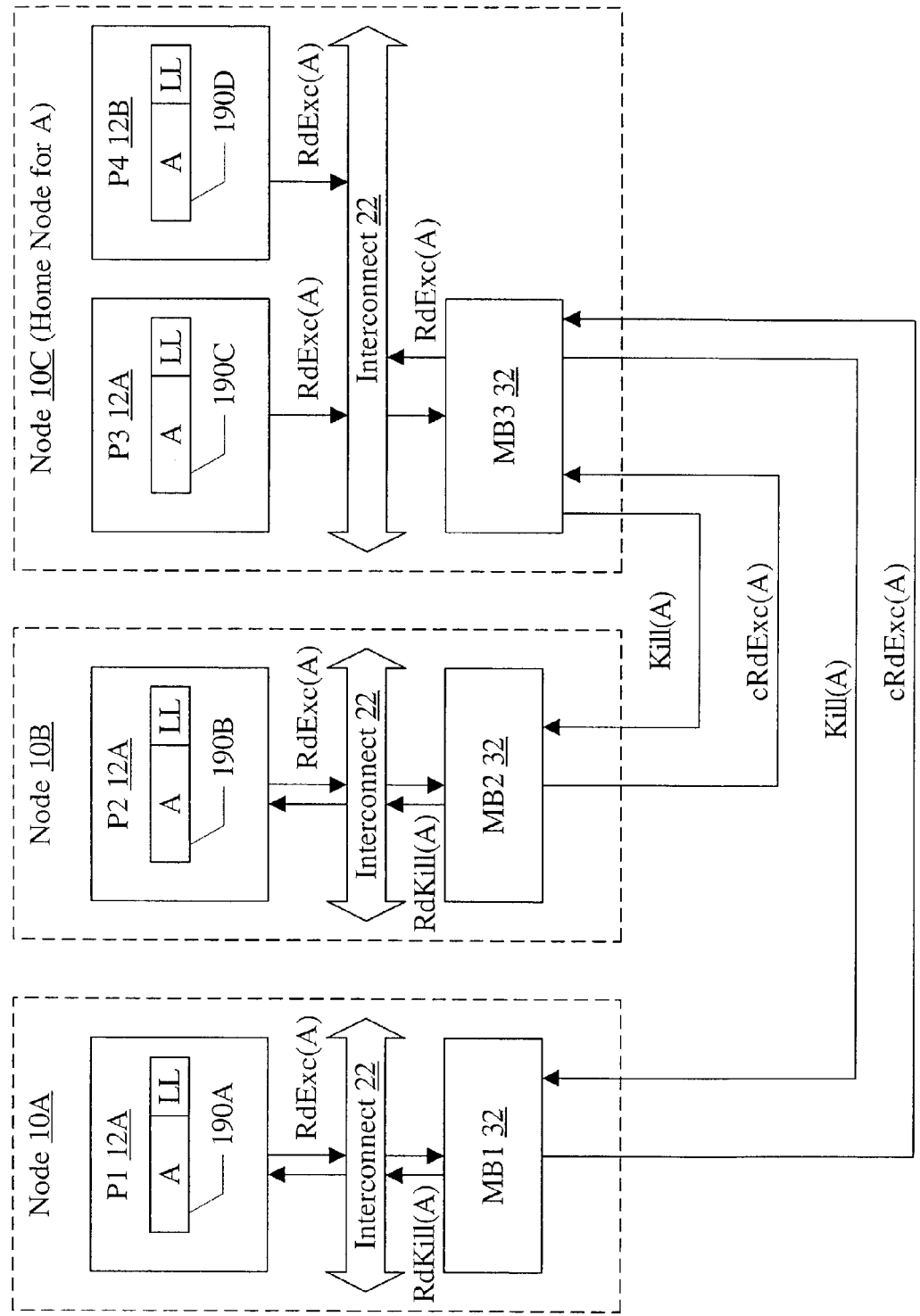
FIG. 7 is a block diagram illustrating a portion of one embodiment of a plurality of nodes and operation of transactions and coherency commands for one embodiment of a load link/store conditional mechanism.
Figure 8:
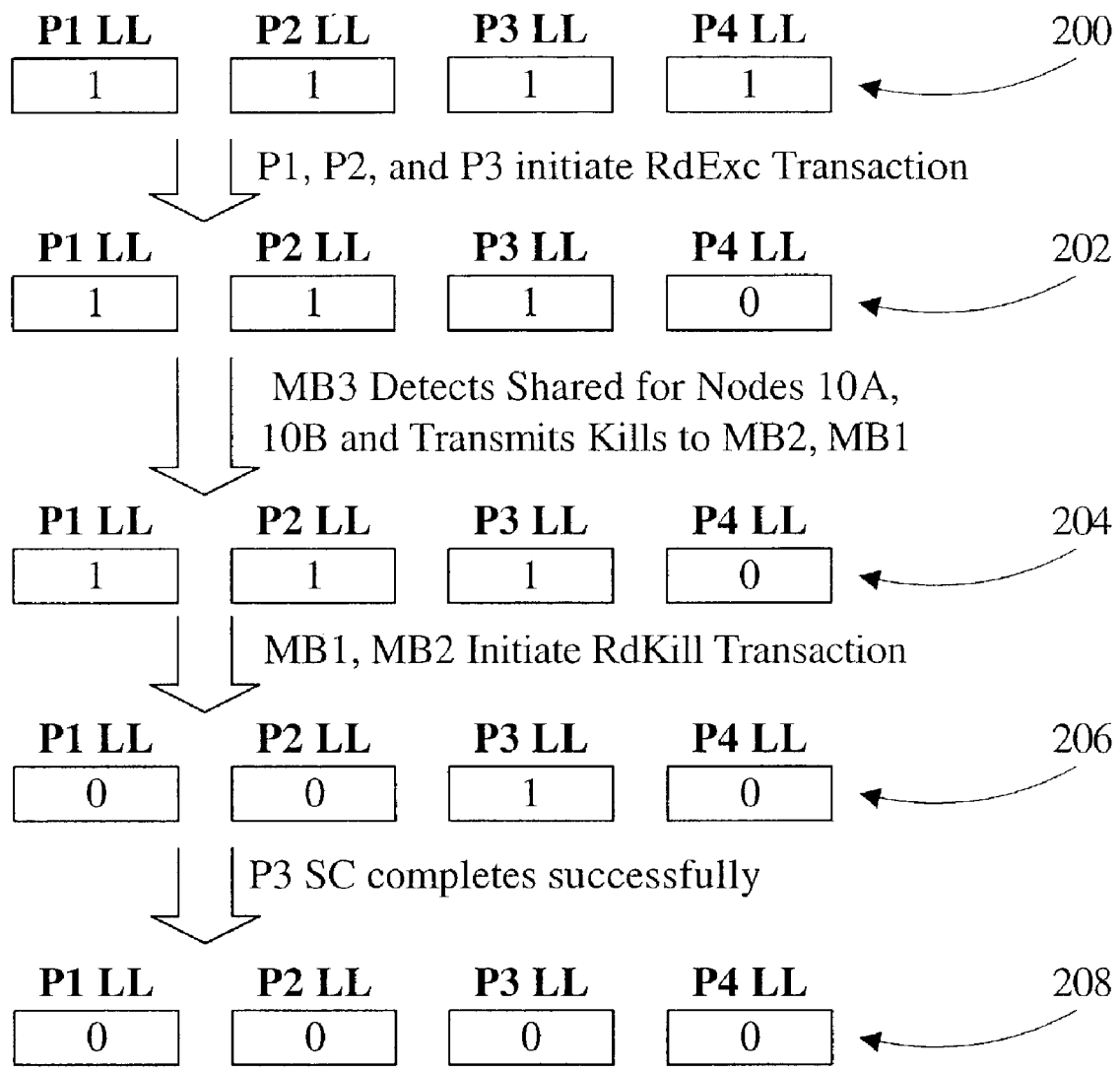
FIG. 8 is a first example of operation of the nodes shown in FIG. 7.
Figure 9:
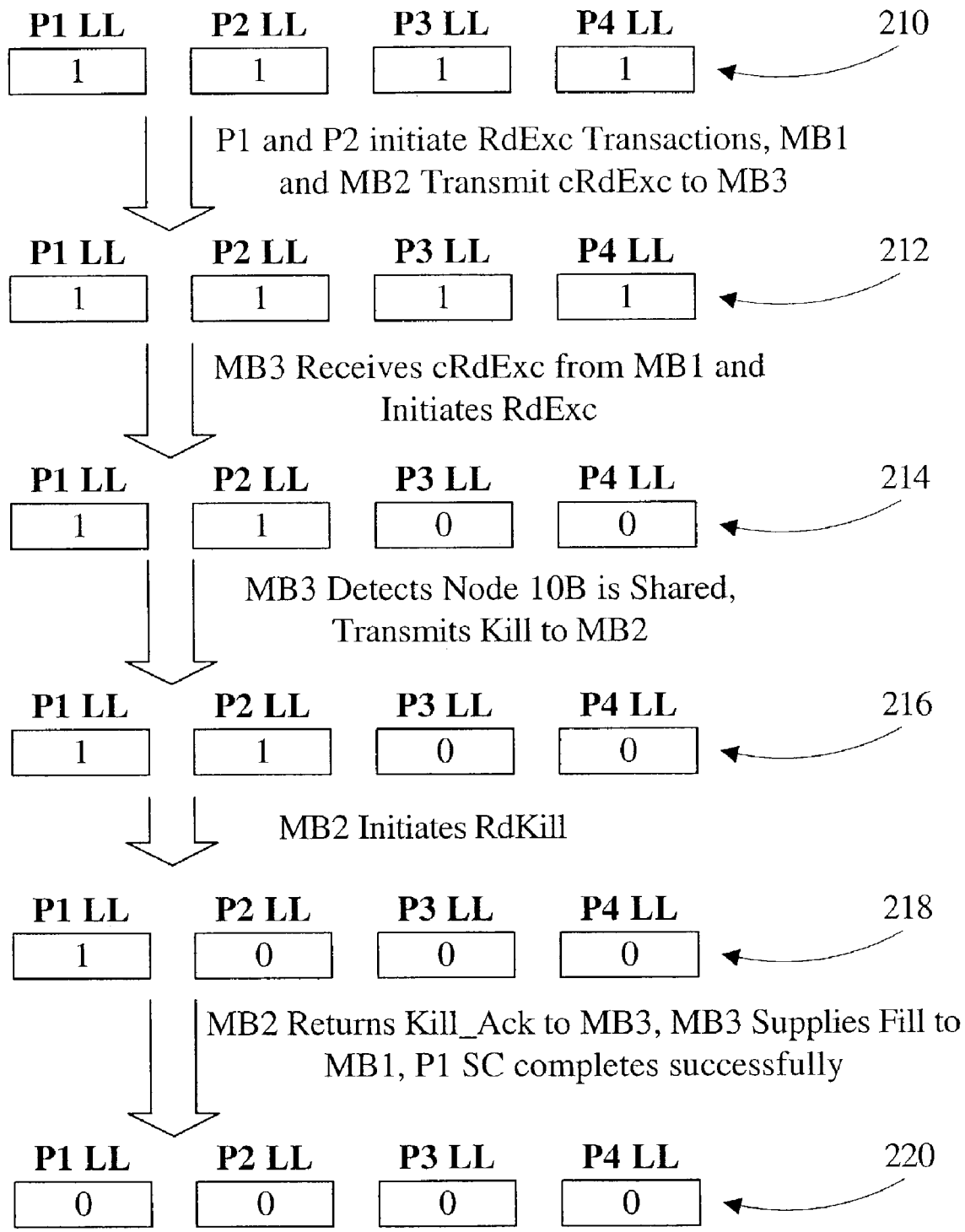
FIG. 9 is a second example of operation of the nodes shown in FIG. 7.
Figure 10:
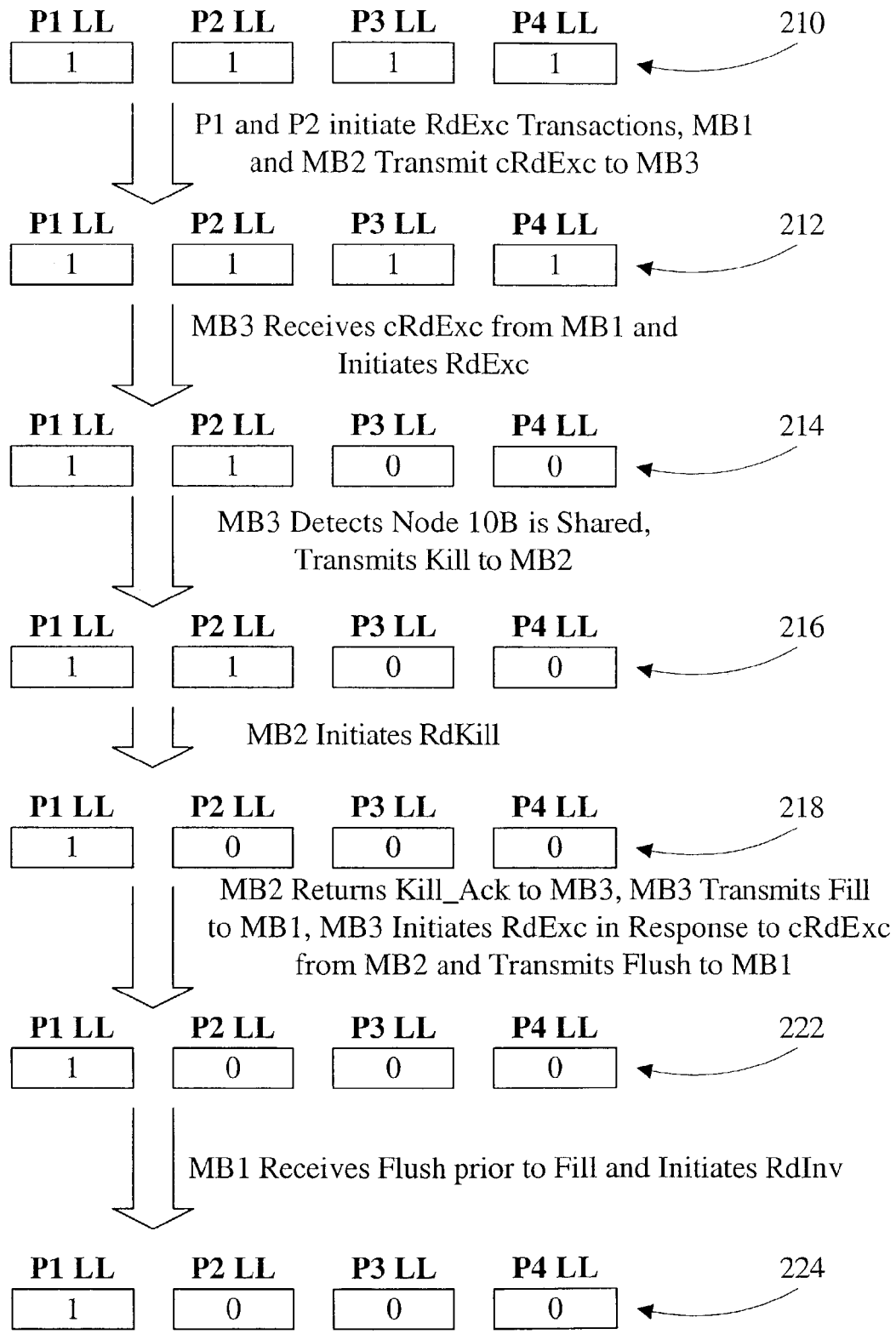
FIG. 10 is a third example of operation of the nodes shown in FIG. 7.
Figure 11:
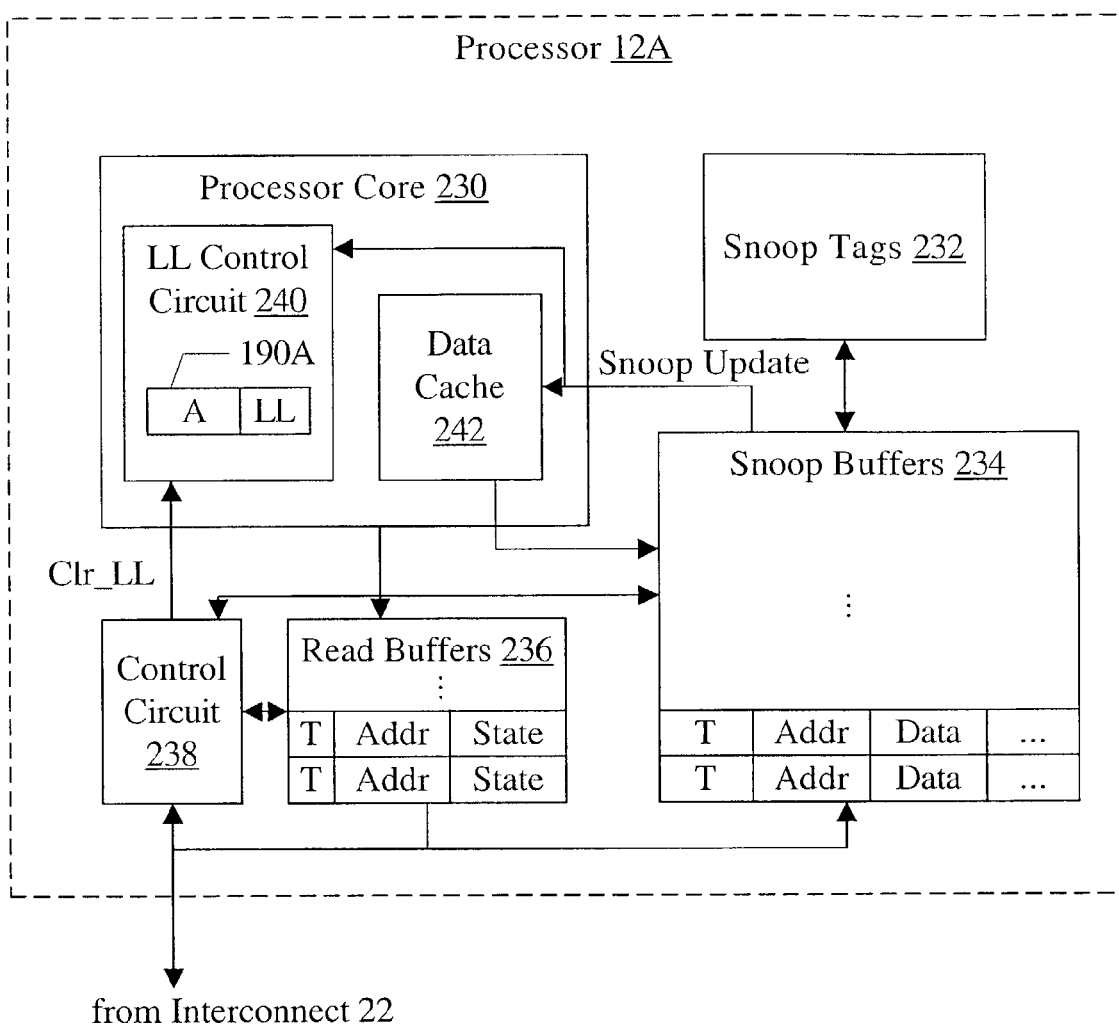
FIG. 11 is a block diagram of one embodiment of a processor.
Figure 12:
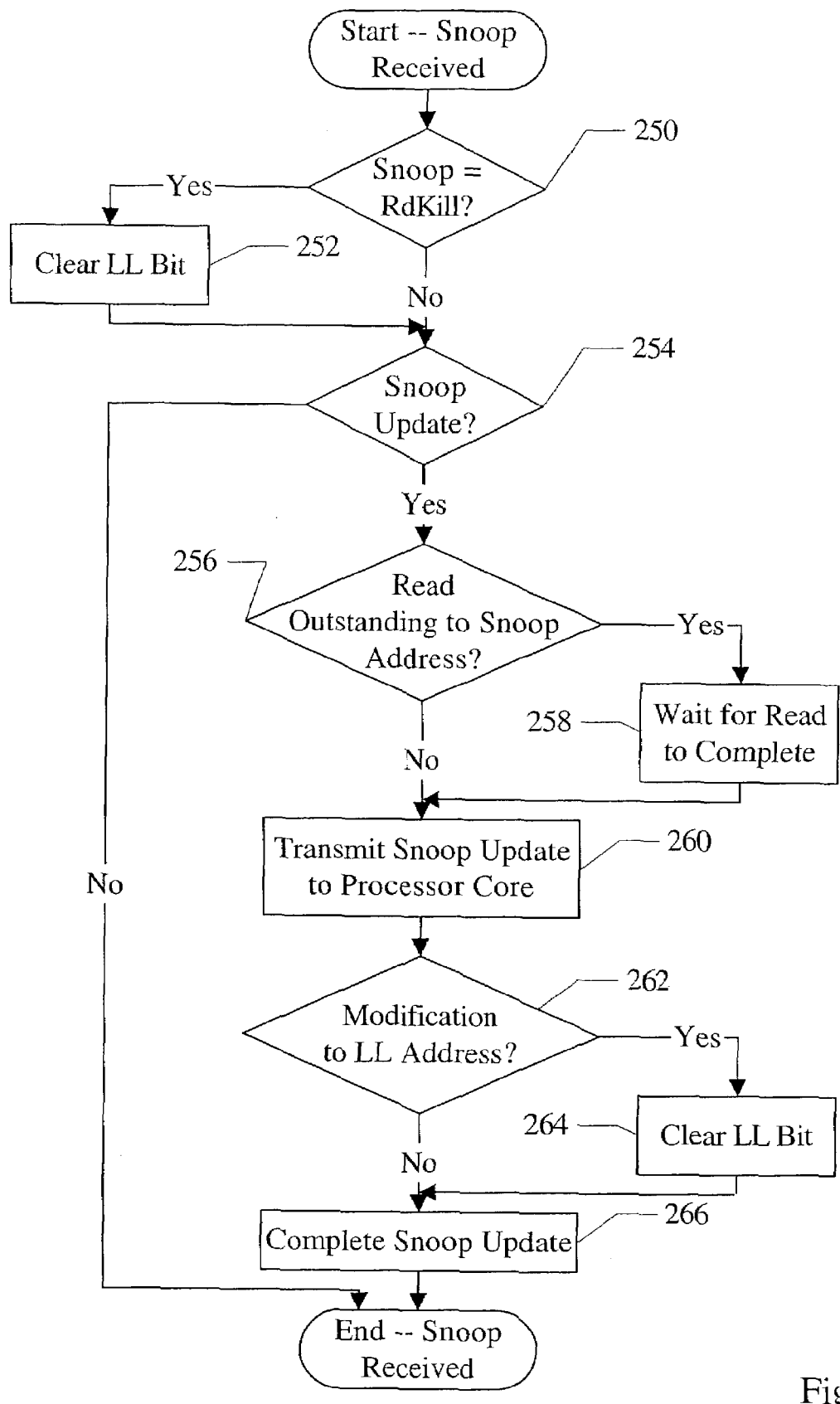
FIG. 12 is a flowchart illustrating operation of one embodiment of the processor shown in FIG. 11.

FIGS. 7-12 illustrate an exemplary implementation of the LL/SC mechanism for a node 10 implementing the CC-NUMA scheme illustrated in FIGS. 2-6. FIG. 7 illustrates a system including three nodes (nodes 10A, 10B, and 10C). FIGS. 8-10 illustrate several examples of the operation of the system. FIG. 11 is an example implementation of a processor 12A-12N, and FIG. 12 is a flowchart illustrating operation of the processor in response to a snooped transaction from the interconnect 22.

Turning now to FIG. 7, a block diagram illustrating one embodiment of a system including multiple nodes (e.g. nodes 10A-10C) is shown. Each of the nodes 10A-10C may be an instantiation of the node 10, for example. A portion of each node 10A-10C is illustrated in FIG. 7. For example, the node 10A includes the processor 12A (labeled P1 for purposes of the examples shown in FIGS. 8-10) and the memory bridge 32 (labeled MB1) both coupled to the interconnect 22. The node 10B includes the processor 12A (labeled P2) and the memory bridge 32 (labeled MB2) both coupled to the interconnect 22. The node 10C includes the processors 12A and 12B (labeled P3 and P4, respectively) and the memory bridge 32 (labeled MB3) all coupled to the interconnect 22. For the illustrated embodiment, the node 10C is the home node for a block A which is used in the discussion as a block including a memory location targeted by LL/SC instructions executing in the processors. Some of the coherency commands communicated between the memory bridges MB1-MB3 are also illustrated in FIG. 7.

Each of the processors P1-P4 may include resources for monitoring at least one address targeted by an LL instruction. For example, illustrated in FIG. 7 is a register in each processor (reference numerals 190A, 190B, 190C, and 190D in processors P1, P2, P3, and P4, respectively). The register may store the address being monitored by the processor, and the aforementioned LL bit. While one register is illustrated in each of the processors P1-P4, in other embodiments additional registers may be implemented to store additional addresses and LL bits.

In the illustrated embodiment, a processor P1-P4 may initiate a RdExc transaction in response to executing an SC instruction (unless the processor P1-P4 already has the addressed block in the exclusive or modified state, or the LL bit is already clear). Often, if processors P1-P4 are competing for the semaphore accessed by the LL/SC instructions, one or more processors P1-P4 may have shared copies of the block (read using the most recently executed LL instruction), and the examples of FIGS. 8-10 and the discussion below assume that shared copies are stored in each of the processors P1-P4. The RdExc transaction has the address of the block A (illustrated as RdExc(A) in the drawings). The various processors P1-P4 may initiate the RdExc(A) transaction at different times with respect to one another. The order of the RdExc transactions is established at the home node 10C, with MB3 performing RdExc transactions on behalf of the other nodes. That is, if P3 performs the RdExc(A) first on the interconnect 22 in the node 10C, then P3 may successfully perform the SC instruction and the other processors P1-P2 and P4 are unsuccessful. Similarly, if P4 performs the RdExc(A) first on the interconnect 22 in the node 10C, then P4 may successfully perform the SC instruction and the other processors P1-P3 are unsuccessful. If MB3 performs the RdExc(A) first on the interconnect 22 in the node 10C, then the processor P1 or P2 (depending on which cRdExc(A) arrives at MB3 first) may successfully perform the SC and the other processors are unsuccessful. MB3 is informed of the RdExc transactions in the other nodes by receiving corresponding cRdExc(A) coherency commands from MB1 and MB2.

More particularly, the first RdExc(A) transaction on the interconnect 22 in the node 10C may cause the LL bits of the processors in the node 10C which did not initiate the first RdExc(A) transaction to be cleared, since these processors do not have the RdExc(A) outstanding. If the processors have another transaction outstanding to the block A, the clearing of the LL bit may be delayed but may occur prior to a RdExc(A) transaction corresponding to the SC instruction.

If one of the processors P3 or P4 initiated the first RdExc(A) transaction, then MB3 may detect that the other nodes 10A-10B have shared copies of the block, and transmits Kill(A) coherency commands to MB1 and MB2 to invalidate the shared copies. In response to the Kill(A) coherency command, each of MB1 and MB2 initiate RdKill transactions in the nodes 10A-10B, respectively, thus clearing the LL bits in the processors P1 and P2 (even if the RdExc(A) transactions are outstanding).

On the other hand, if MB3 performs the first RdExc(A) transaction on the interconnect 22, the LL bits in each of the processors P3-P4 may be cleared (since they do not have outstanding transactions to the block). Additionally, MB3 may detect that shared copies exist in the nodes 10A-10B and may transmit a Kill(A) coherency command to the node 10A-10B that is not the node that transmitted the cRdExc(A) coherency command that caused the RdExc(A) transaction initiated by MB3. In this manner, the processors in other nodes than the node 10C may have their LL bits cleared. After the node or nodes respond to the Kill commands (not shown in FIG. 7), MB3 may transmit the Fill coherency command to the node 10A-10B that initiated the cRdExc(A) coherency command, and the processor in that node that initiated the corresponding RdExc(A) transaction may receive the fill data and complete its SC instruction successfully.

It is noted that any of the nodes 10A-10C may be the home node, depending on the address of the memory location that is being competed for in the LL/SC instructions being executed by the various processors P1-P4.

Turning next to FIGS. 8-10, various examples of the operation of the system shown in FIG. 7 are illustrated for resolving SC competition. The LL bit for each of the processors P1-P4 is illustrated, followed by a set of one or more actions that occur in the example, followed by an updated set of LL bits. Operations to set the LL bits (by executing LL instructions, including any transactions that may be performed to successfully read the block A) are not illustrated in the examples for brevity. In each case of a set LL bit, an LL instruction was previously executed.

FIG. 8 is an example in which the processor P3 (a processor in the home node of the block A) is the first to perform a RdExc(A) transaction on the interconnect 22 in the home node in response to executing an SC instruction. Beginning at the top of FIG. 8, each of the processors P1-P4 may have a set LL bit (reference numeral 200). Each of the processors P1, P2, and P3 may initiate RdExc(A) transactions on their respective interconnects 22 in response to executing SC instructions. Since P3 is the first to initiate a RdExc(A) transaction in the node 10C, P3 is to be the processor that successfully completes the SC instruction in this case. P4 snoops the RdExc(A) transaction, and thus resets its LL bit since it does not have an outstanding transaction to block A (reference numeral 202).

In response to P3's RdExc(A) transaction, MB3 detects that nodes 10A and 10B have shared copies of the block and transmits Kill coherency commands to MB2 and MB1. No additional updates to the LL bits occur in response to these activities (reference numeral 204). Each of MB1 and MB2 receive Kill coherency commands and initiate RdKill transactions on the interconnect 22 in the nodes 10A and 10B, respectively. In response to the RdKill transactions, the processors P1 and P2 reset their LL bits even though the have RdExc transactions outstanding to block A (reference numeral 206). It is noted that MB1 and MB2 may receive the coherency commands at different times and/or may initiate the corresponding RdKill transactions at different times.

MB1 and MB2 return Kill_Ack coherency commands to MB3, and the RdExc(A) command is permitted to complete. P3 successfully completes its SC instruction, resetting its LL bit (reference numeral 208).

FIG. 9 is an example in which MB3 (on behalf of a processor in another node) is the first to perform a RdExc(A) transaction on the interconnect 22 in the home node. Beginning at the top of FIG. 9, each of the processors P1-P4 has its LL bit set (reference numeral 210). P1 and P2 each initiate RdExc(A) transactions in the nodes 10A-10B. In response, each of MB1 and MB2 transmit cRdExc(A) coherency commands to MB3. No update of the LL bits occurs to this point (reference numeral 212).

MB3 receives the cRdExc(A) coherency command from MB1 and initiates a RdExc(A) transaction on the interconnect 22. Since this RdExc(A) transaction occurs first in the home node, the processor P1 successfully performs its SC instruction for this example. In response to the RdExc(A) transaction and since the processors P3 and P4 do not have outstanding transactions to the block A, the processors P3 and P4 reset their LL bits (reference numeral 214).

In response to the RdExc(A) transaction, MB3 detects that node 10B has a shared copy, and transmits a Kill(A) coherency command to MB2. No additional LL bit updates occur at this point (reference numeral 216). MB2 receives the Kill(A) coherency command and initiates a RdKill(A) transaction on the interconnect 22 in the node 10B. In response, the processor P2 resets its LL bit even though it has a RdExc transaction outstanding to block A (reference numeral 218). MB2 returns a Kill_Ack(A) coherency command to MB3, and MB3 supplies the Fill command to MB1. MB1 supplies the data from the Fill command to processor P1, which completes its SC instruction successfully and resets its LL bit (reference numeral 220).

FIG. 10 is an example similar to FIG. 9, except that MB3 begins processing the next cRdExc(A) coherency command (from MB2) and transmits a Flush(A) coherency command to MB1 that arrives prior to the Fill(A) command in MB1. Thus, similar to FIG. 9, the processors P1 and P2 initiate RdExc(A) transactions that cause cRdExc(A) coherency commands; MB3 receives the cRdExc(A) command from MB1 first and transmits a RdExc(A) transaction on the interconnect 22 (which resets the P3 and P4 LL bits) and transmits a Kill(A) coherency command to MB2; and MB2 performs a RdKill transaction which causes P2 to reset its LL bit (reference numerals 210-218).

MB2 returns the Kill_Ack(A) coherency command to MB3, which transmits the Fill(A) command to MB1. Subsequently, MB3 begins processing the cRdExc(A) coherency command from MB2, and detects that node 10A has a modified copy of the block (i.e. modified by completing the SC instruction successfully). MB3 transmits a Flush(A) coherency command to MB1. No update of the LL bits occurs due to these activities (reference numeral 222). In this example, MB1 receives the Flush(A) coherency command prior to the Fill(A) coherency command, and initiates a RdInv(A) transaction in response. Since the RdInv(A) transaction is not the RdKill(A) transaction and the processor P1 has an outstanding transaction to the block A (the RdExc(A) transaction), the processor P1 delays updating the LL bit in response to the RdInv(A) transaction (reference numeral 224). Subsequently (not shown in FIG. 10), the Fill(A) coherency command arrives and the processor P1 completes its SC instruction successfully. The block, modified in response to the SC instruction, may be returned to MB3 in response to the RdInv probe command.

It is noted that, if the same transaction were used for Kill probes and Flush probes, the example of FIG. 10 would end with no processors P1-P4 completing their SC instructions successfully. Such embodiments may be used, since the Flush coherency command may be unlikely to arrive before the Fill coherency command each time the LL/SC instruction sequence is reexecuted.

Turning now to FIG. 11, a block diagram of one embodiment of the processor 12A is shown. Other processors 12B-12N may be similar. In the embodiment of FIG. 11, the processor 12A includes a processor core 230, a snoop tags memory 232, a set of snoop buffers 234, a set of read buffers 236, and a control circuit 238. The processor core 230 includes an LL control circuit 240 (which includes the register 190A) and a data cache 242. The control circuit 238 is coupled to receive transaction information from the interconnect 22, is coupled to the processor core 230 (and more particularly to the LL control circuit 240) via a Clr_LL signal, and is coupled to the read buffers 236 and the snoop buffers 234. The read buffers 236 are coupled to the processor core 230 and to provide transaction information to the interconnect 22. The snoop buffers 234 are coupled to the processor core 230, the snoop tags memory 232, and to receive transaction information from the interconnect 22.

The control circuit 238 is configured to control communication between the processor core 230 and the interconnect 22. Generally, the processor core 230 may include circuitry for executing instructions, including LL and SC instructions. In response to the processor core 230 executing an LL instruction, the LL control circuit 240 may update the LL register 190A with the target address of the LL instruction and may set the LL bit. The LL control circuit 240 may clear the LL bit in response to successful completion of an SC instruction (e.g. when the SC instruction updates the data cache 242, with the LL bit still set, which may occur after a fill from a RdExc command caused by the SC instruction). Additionally, the LL control circuit 240 may clear the LL bit in response to an assertion of the Clr_LL signal by the control circuit 238 or in response to a snoop update from the snoop buffers 234. The control circuit 238 may assert the Clr_LL signal in response to detecting a RdKill transaction from the interconnect 22. The snoop update from the snoop buffers 234 may be generated in response to a previously snooped transaction and, if the processor 12A had an outstanding transaction to the address of the snooped transaction, after the processor 12A completes the outstanding transaction.

In one implementation, the control circuit 238 may assert the Clr_LL signal in response to an RdKill transaction. In other words, the control circuit 238 may assert the Clr_LL signal without verifying if the processor 12A has a transaction outstanding and without verifying that the outstanding transaction is to the same address (within the granularity implemented for the LL/SC instructions) as the snooped RdKill transaction. Thus, in this implementation, the Clr_LL signal is asserted if a RdKill transaction is snooped during a time period that the processor 12A has a transaction outstanding to the same address as the RdKill transaction. It is also asserted at other times that a RdKill transaction is snooped (e.g. when a transaction is outstanding to a different address (within the granularity implemented for the LL/SC instructions) than the RdKill transaction, or when no transaction is outstanding). Other embodiments may implement more accurate mechanisms for detecting that the LL bit is to be reset. For example, the control circuit 238 may assert the Clr_LL signal in response to any RdKill transaction that occurs during a time period that the processor 12A has any outstanding transaction. Alternatively, the control circuit 238 may assert the Clr_LL signal in response to any RdKill transaction that occurs during a time period that the processor 12A has an outstanding read transaction (in the read buffers 236). In another implementation, the control circuit 238 may assert the Clr_LL signal in response to any RdKill transaction that occurs during a time period that the processor 12A has an outstanding read exclusive transaction (in the read buffers 236). In other embodiments, the control circuit 238 may assert the Clr_LL signal in response to any RdKill transaction that occurs during a time period that the processor 12A has an outstanding read (or read exclusive) transaction (in the read buffers 236) to the same address (within the implemented granularity) as the RdKill transaction. In still other embodiments, the address of the RdKill transaction may be compared to the address in the LL register 190A to determine if the LL bit is to be cleared (e.g. similar to operation when the snoop update is performed).

In response to a coherent transaction initiated by another agent on the interconnect 22, the control circuit 238 may allocate a snoop buffer to store the snoop. Several exemplary entries are shown in FIG. 11, and may include a snoop type (T), the address of the transaction (Addr) and a data field (Data) to store data provided by the processor core 230 in response to the snoop until the processor 12A transmits the data on the interconnect 22. The snoop type may be the transaction type from the transaction or may be derived from the transaction type, as desired.

To determine a response for the response phase of a snooped transaction, the present embodiment employs the snoop tags memory 232. The snoop tags memory 232 may be a duplicate set of tags to the caches in the processor core 230 (e.g. the data cache 242) which may be available for snooping (thus obviating the need to interrupt processor core 230 accesses to the data cache 242 or to provide a snoop port on the data cache 242 for snooping). The snoop is provided from the snoop buffers 234 to the snoop tags memory 232 to determine the response. While FIG. 11 illustrates the snoop tags memory 232 being accessed from the snoop buffers 234, which receive the snooped transaction information from the interconnect 22, it is noted that the snoop tags memory 232 may be accessed in parallel with storing the snooped transaction information in the snoop buffers 234.

The snoop tags memory 232 may include enough state for each cache block to determine a snoop response, but may not contain all of the state in the caches. For example, in one embodiment, the snoop tags memory 232 may track the invalid, shared, and exclusive states for each cache block but may not differentiate between exclusive and modified. If the snoop response is exclusive for a cache block, the processor 12A may provide data for the snooped transaction and may indicate if the data is exclusive or modified in the data transfer. Other embodiments may also track the modified state and may provide data only if the state is modified.

In addition to determining a response for the response phase of the snooped transaction, the processor 12A may detect that a state update is required to complete the coherent response to the snooped transaction. Additionally, the processor 12A may provide the data for the snooped transaction. Accordingly, a snoop update may be transmitted from the snoop buffers 234 to the processor core 230 (and more particularly to the data cache 242 and the LL control circuit 240). As mentioned before, the control circuit 238 may delay the snoop update if a transaction to the same address as the snooped transaction is outstanding from the processor 12A. In response to the snoop update, the data cache 242 may update the coherency state of the block affected by the snoop, and may provide the data to the snoop buffers 234 if the block is exclusive or modified. If the snoop update indicates a modification of the block tracked by the LL register 190A (e.g. a RdExc, RdInv, RdKill, Wr, or WrInv transaction was snooped), the LL control circuit 240 may clear the LL bit, as mentioned above.

The processor core 230 may insert read transactions in the read buffers 236 for transmission on the interconnect 22 (including RdExc transactions corresponding to SC instructions). The control circuit 238 may allocate a read buffer to store the read transaction, and may cause the read transaction to be transmitted on the interconnect 22 according to the protocol on the interconnect 22. Exemplary read buffer contents are shown in FIG. 11 and include a type field (T) storing a type of read transaction (e.g. RdShd or RdExc), and address field (Addr) including the address of the read transaction, and a state field (State) indicating the state of the transaction (e.g. not transmitted, outstanding, etc.). Additional information may be provided in each read buffer as desired.

Turning now to FIG. 12, a flowchart is shown illustrating operation of one embodiment of the processor 12A in response to snooping a transaction from the interconnect 22. Other processors 12B-12N may be similar. While the blocks are shown in FIG. 12 in a particular order for ease of understanding, any order may be used. Furthermore, blocks may be performed in parallel in combinatorial logic in the processor 12A. Other blocks may represent multiple clock cycles, or may be pipelined over multiple clock cycles.

If the snooped transaction is a RdKill transaction (decision block 250—"yes" leg), the processor 12A clears the LL bit (block 252). Additionally, using the snoop tags memory 232, the processor 12A may determine if there is a snoop update to be performed (decision block 254). If not, the snoop is complete and the snoop buffer may be released. If so, the processor 12A may determine if there is a read outstanding to the snoop address (decision block 256). If there is (decision block 256—"yes" leg), the processor 12A may delay the snoop update until the outstanding read transaction completes (block 258). Thus, block 258 may represent a delay of one or more clock cycles.

The processor 12A then transmits the snoop update (either with delay or without delay, depending on the outcome of decision block 256) to the processor core 230 (block 260). If the snooped transaction is a transaction to the LL address in the LL register 190A that indicates modification of the data (decision block 262—"yes" leg), the processor core 230 clears the LL bit (block 264). Additionally, the processor core 230 makes any additional state changes desired to complete the snoop update (block 266).

Computer Accessible Medium

Figure 13:
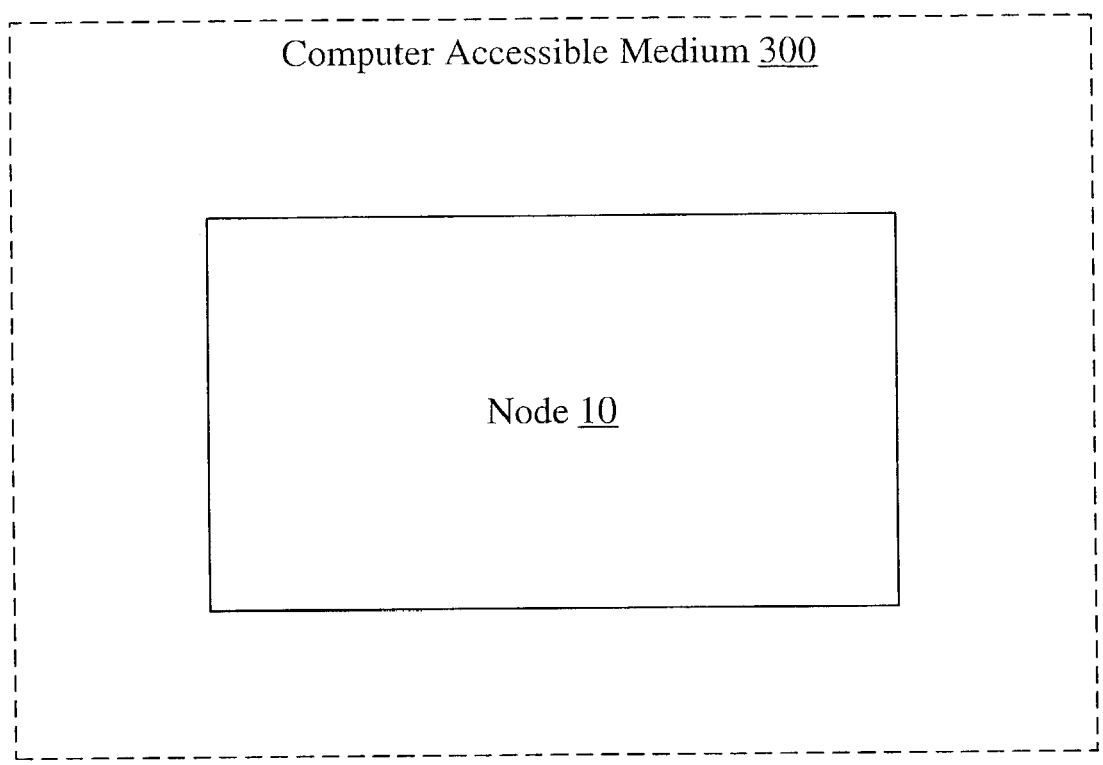
FIG. 13 is a block diagram of one embodiment of a computer accessible medium.

Turning next to FIG. 13, a block diagram of a computer accessible medium 300 including one or more data structures representative of the circuitry included in the node 10 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the node 10, other embodiments may include a representation of any portion of the node 10 (e.g. processors 12A-12N, memory controller 14, L2 cache 36, interconnect 22, memory bridge 32, remote line directory 34, switch 18, interface circuits 20A-20C, etc.).

Numerous variations and modifications will become apparent to those skilled in the art once the above disclosure is fully appreciated. It is intended that the following claims be interpreted to embrace all such variations and modifications.

What is claimed is:

1. A node comprising:
a processor coupled to an interconnect which is internal to a local node, wherein the processor is configured to maintain an indication of whether or not a modification of data at a first address has been detected by the processor after a load-linked (LL) instruction is executed by the processor on the interconnect to the first address, wherein when the indication is in a first state to indicate that the modification has been detected, a store conditional (SC) instruction associated with the LL instruction and executed by the processor is prevented from completing successfully, and wherein when the indication is in a second state to indicate that no modification has been detected, the SC instruction is allowed to be completed by the processor; and a memory bridge coupled to the interconnect of the local node and to a plurality of remote nodes via a connection external to the local node, in which the memory bridge communicates with the remote nodes and operates as an agent for the remote nodes on the interconnect to maintain coherency between the processor and the remote nodes, wherein the memory bridge is configured to initiate a first transaction on the interconnect in response to receiving an access command from one or more of the remote nodes to access the first address;

wherein when the processor is allowed to complete the LL instruction and the associated SC instruction, the memory bridge is to send a kill command to the remote node or nodes to terminate the access to the first address by the remote node or nodes, but when the processor is prevented from executing the SC instruction due to the memory bridge winning access to the first address to cause the modification, the memory bridge is to identify and notify a remote node winning the access to modify the first address and to send a kill command to other remote node or nodes that failed in winning the access.

2. The node as recited in claim 1 further comprising an intra-node agent coupled to the interconnect, the intra-node agent configured to initiate a second transaction on the interconnect to also attempt access to the first address to modify the data.

3. The node as recited in claim 2 wherein the intra-node agent includes another processor.

4. The node as recited in claim 2 wherein the second transaction is a different transaction type on the interconnect from the first transaction.

5. The node as recited in claim 1 wherein the processor is configured to change the indication in response to the first transaction even if the LL and SC instructions of the processor are not outstanding.

6. The node as recited in claim 1 wherein the processor is configured to change the indication in response to the first transaction even if the first transaction is to a second address that is different from the first address but within a granularity used for the LL and SC instructions.

7. A processor comprising:

a storage location configured to store a first address and an indication corresponding to a state of data at the first address, in which the indication is indicative of whether or not a modification of data at the first address has occurred after a load-linked (LL) instruction is executed by a processor to the first address on an interconnect that is internal to a local node, wherein when the indication is in a first state that indicates that the modification has been detected, a store conditional (SC) instruction associated with the LL instruction and executed by the processor is prevented from completing successfully, and wherein when the indication is in a second state that indicates that no modification has been detected, the SC instruction is allowed to be completed by the processor; and a control circuit coupled to receive transactions from the interconnect to which the processor and a memory bridge are coupled, wherein the control circuit is configured to distinguish between a first transaction initiated in response to an access command to access the first address from one or more remote nodes via the memory bridge and the LL instruction from the processor, in which the memory bridge communicates with the remote nodes via a connection external to the local node and operates as an agent for the remote nodes on the interconnect to maintain coherency between the processor and the remote nodes;

wherein when the processor is allowed to complete the LL instruction and the associated SC instruction, the memory bridge is to send a kill command to the remote node or nodes to terminate the access to the first address by the remote node or nodes, but when the processor is prevented from executing the SC instruction due to the memory bridge winning access to the first address to cause the modification, the memory bridge is to identify and notify a remote node winning the access to modify the first address and to send a kill command to other remote node or nodes that failed in winning the access.

8. The processor as recited in claim 7, wherein the control circuit is configured to cause the indication to be changed to the first state responsive to a second transaction on the interconnect by another processor of the local node coupled to the interconnect and when the another processor wins access to the first address while the SC instruction is outstanding.

9. The processor as recited in claim 7 wherein the first transaction is a different transaction type on the interconnect from the LL and SC instructions.

10. The processor as recited in claim 7 wherein the control circuit is configured to cause the indication to be changed in response to the first transaction even if the LL and SC instructions of the processor are not outstanding.

11. The processor as recited in claim 7 wherein the control circuit is configured to cause the indication to be changed in response to the first transaction even if the first transaction is to a second address that is different from the first address, but within a granularity used for the LL and SC instructions.

* * * * *

UNITED STATES PATENT AND TRADEMARK OFFICE
CERTIFICATE OF CORRECTION

PATENT NO. : 7,343,456 B2 Page 1 of 1
APPLICATION NO. : 10/435189
DATED : March 11, 2008
INVENTOR(S) : Joseph B. Rowlands It is certified that error appears in the above-identified patent and that said Letters Patent is hereby corrected as shown below:

Column 27, line 43, in Claim 6: insert a comma after "address"

Signed and Sealed this

Sixth Day of January, 2009

JON W. DUDAS
*Director of the United States Patent and Trademark Office*